(12) United States Patent
Low et al.

(10) Patent No.: US 10,571,172 B2
(45) Date of Patent: Feb. 25, 2020

(54) COMPOSITIONS COMPRISING 1,1-DIFLUOROETHENE (R-1132A)

(71) Applicant: Mexichem Fluor S.A. de C.V., San Luis Potosi (MX)

(72) Inventors: Robert E. Low, Cheshire (GB); Andrew P. Sharratt, Cheshire (GB)

(73) Assignee: MEXICHEM FLUOR S.A. DE C.V. (MX)

( * ) Notice: Subject to any disclaimer, the term of this patent is extended or adjusted under 35 U.S.C. 154(b) by 0 days.

(21) Appl. No.: 16/522,409

(22) Filed: Jul. 25, 2019

(65) Prior Publication Data

US 2019/0353411 A1 Nov. 21, 2019

Related U.S. Application Data

(60) Continuation of application No. 15/787,508, filed on Oct. 18, 2017, now Pat. No. 10,371,425, which is a (Continued)

(30) Foreign Application Priority Data

Jul. 30, 2013 (GB) ..................................... 313615.5

(51) Int. Cl.
*C09K 5/04* (2006.01)
*F25B 45/00* (2006.01)
(Continued)

(52) U.S. Cl.
CPC .......... *F25B 45/00* (2013.01); *B01D 11/0288* (2013.01); *B01D 11/0492* (2013.01); *C09K 3/30* (2013.01); *C09K 5/045* (2013.01); *C11D 7/04* (2013.01); *C11D 7/50* (2013.01); *C11D 7/505* (2013.01); *C11D 7/5072* (2013.01); (Continued)

(58) Field of Classification Search
CPC ................ C09K 5/045; C09K 2205/22; C09K 2205/126
See application file for complete search history.

(56) References Cited

U.S. PATENT DOCUMENTS

| 4,674,297 A | 6/1987 | Vobach |
| 6,054,064 A | 4/2000 | D'Aubarede et al. |

(Continued)

FOREIGN PATENT DOCUMENTS

| CN | 1183451 A | 6/1998 |
| CN | 1347950 A | 5/2002 |

(Continued)

OTHER PUBLICATIONS

Kazakov A. et al., *Computational Design of New Refrigerant Fluids Based on Environmental, Safety, and Thermodynamic Characteristics*, Industrial & Engineering Chemistry Research, 2012, 51(38), 12537-12548.
(Continued)

*Primary Examiner* — John R Hardee
(74) *Attorney, Agent, or Firm* — Brinks Gilson & Lione

(57) ABSTRACT

The invention provides a composition comprising 1,1-difluoroethene (R-1132a); a second component selected from the group consisting of hexafluoroethane (R-116), ethane (R-170) and mixtures thereof; and, optionally carbon dioxide ($CO_2$, R-744).

21 Claims, 6 Drawing Sheets

Calculated refrigeration cycle performance for R-1132a/R-116 mixtures

Related U.S. Application Data division of application No. 14/908,326, filed as application No. PCT/GB2014/052321 on Jul. 29, 2014, now Pat. No. 9,835,365.

(51) Int. Cl.

| | | |
|---|---|---|
| *C11D 7/04* | (2006.01) | |
| *C11D 7/50* | (2006.01) | |
| *B01D 11/02* | (2006.01) | |
| *C09K 3/30* | (2006.01) | |
| *B01D 11/04* | (2006.01) | |
| *F25B 7/00* | (2006.01) | |
| *F01K 5/02* | (2006.01) | |

(52) U.S. Cl.
CPC ............ *F01K 5/02* (2013.01); *F25B 7/00* (2013.01); *C09K 2205/106* (2013.01); *C09K 2205/12* (2013.01); *C09K 2205/122* (2013.01); *C09K 2205/126* (2013.01); *C09K 2205/128* (2013.01); *C09K 2205/22* (2013.01); *C09K 2205/32* (2013.01); *C09K 2205/40* (2013.01)

(56) References Cited

U.S. PATENT DOCUMENTS

| | | | |
|---|---|---|---|
| 6,065,305 A | 5/2000 | Arman et al. | |
| 6,076,372 A | 6/2000 | Acharya et al. | |
| 6,297,168 B1 | 10/2001 | Shieh et al. | |
| 8,911,641 B2* | 12/2014 | Low | B60H 1/3204 |
| | | | 134/36 |
| 8,961,811 B2 | 2/2015 | Minor et al. | |
| 8,961,812 B2 | 2/2015 | Minor et al. | |
| 9,074,115 B2* | 7/2015 | Low | C08J 9/146 |
| 10,266,736 B2* | 4/2019 | Low | C08J 9/149 |
| 2002/0140118 A1 | 10/2002 | Lee | |
| 2008/0053908 A1 | 3/2008 | Chordia et al. | |
| 2008/0230738 A1 | 9/2008 | Minor et al. | |
| 2010/0181524 A1 | 7/2010 | Elsheikh et al. | |
| 2011/0252801 A1 | 10/2011 | Minor et al. | |
| 2011/0253927 A1 | 10/2011 | Minor et al. | |
| 2013/0153817 A1 | 6/2013 | Singh et al. | |
| 2014/0077122 A1 | 3/2014 | Fukushima | |
| 2014/0077123 A1 | 3/2014 | Fukushima | |
| 2016/0018135 A1 | 1/2016 | Yuzawa et al. | |
| 2016/0178246 A1* | 6/2016 | Toyooka | F25B 7/00 |
| | | | 62/335 |
| 2016/0187038 A1* | 6/2016 | Toyooka | F25B 7/00 |
| | | | 62/167 |

FOREIGN PATENT DOCUMENTS

| | | |
|---|---|---|
| CN | 1347951 A | 5/2002 |
| CN | 101135509 A | 3/2008 |
| CN | 101285657 A | 10/2008 |
| DE | 102007057262 A1 | 5/2009 |
| WO | WO 2009/105517 A2 | 8/2009 |
| WO | WO 2009/137656 A1 | 11/2009 |
| WO | WO 2010/042781 A2 | 4/2010 |
| WO | WO 2012/157763 A1 | 11/2012 |
| WO | WO 2012/157765 A1 | 11/2012 |
| WO | WO 2014/156190 A1 | 10/2014 |

OTHER PUBLICATIONS

International Search Report for related International Application No. PCT/GB2014/052321, 5 pages, dated Nov. 25, 2014.

Paulus-Lanckriet M. et al., Proceedings—International Congress of Refrigeration, 19$^{th}$, The Hague, Aug. 20-25, 1995, vol. 4A, 472-480.

Zenkevich I. et al., Vestnik Sankt-Peterburgskogo Universiteta, Seriya 4: Fizika Khimiya, 1992, 1, 66-70 (with English translation).

* cited by examiner

Figure 1: Phase equilibrium behaviour of R-1132a/R-116 mixtures showing azeotropy Figure 2: Vapour pressure of R-1132a/R-116 mixtures Figure 3: Calculated refrigeration cycle performance for R-1132a/R-116 mixtures Figure 5: Calculated refrigeration cycle performance for R-1132a/R-116/R-744 mixtures

COMPOSITIONS COMPRISING 1,1-DIFLUOROETHENE (R-1132A)

This application is a continuation of U.S. patent application Ser. No. 15/787,508, now U.S. Pat. No. 10,371,425, which is a divisional of U.S. patent application Ser. No. 14/908,326 that issued as U.S. Pat. No. 9,835,365, which is the U.S. National Phase under 35 U.S.C. § 371 of International Application No. PCT/GB2014/052321, filed Jul. 29, 2014, designating the United States and published in English on Feb. 5, 2015, as WO 2015/015188, which claims priority to United Kingdom Application No. 1313615.5, filed Jul. 30, 2013, each of which is incorporated by reference in its entirety.

The invention relates to compositions, preferably to heat transfer compositions, and in particular to ultra-low temperature heat transfer compositions which may be suitable as replacements for existing refrigerants such as R-508A, R-508B, R23 or R13B1.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

Certain refrigerant applications, notably biomedical refrigeration, use low-boiling refrigerant gases to achieve cooling of materials, typically to temperatures of about −85° C. or below. These fluids are sometimes referred to as ultra-low temperature (ULT) or cryogenic refrigerants.

The most commonly used non-flammable ULT refrigerants currently are R-508A and R-508B. The term R-508 is used herein to refer to R-508A and R-508B, which are both mixtures of trifluoromethane (R-23) with hexafluoroethane (R-116) and are rated A1 by the ASHRAE Standard 34 classification.

Typical low-temperature applications of R-508 fluids are normally cascade systems: a first vapour compression refrigeration cycle cools air inside a refrigerated compartment to between about −80 and −95° C. by evaporation of liquid R-508. The gaseous refrigerant is then compressed and condensed in a heat exchanger, where it vaporises a second refrigerant (for example R-404A). A typical condensing temperature for R-508 in this exchanger is in the range −50 to −30° C. The second refrigerant vapour is compressed by a second compressor and is then condensed against ambient air.

The greenhouse (or global) warming potential (GWP) of low boiling non-flammable refrigerant gases such as R-508 or R-23 is high (e.g. about 13000), and it is desired to find fluids able to be used in this application with lower GWP, so as to reduce environmental impact of refrigerant leakage.

In looking for alternative low temperature refrigerants several other factors must also be considered. Firstly, if the fluid is to be used as a retrofit or conversion fluid in existing equipment, or as a "drop-in" to new equipment using an essentially unchanged R-508 system design, then non-flammability is highly desired, as the existing design will have been based on the use of non-flammable fluid.

If an alternative fluid is to be employed in a wholly new system design then a degree of flammability may be tolerable; but the use of highly flammable fluids may impose cost and performance penalties to mitigate hazards. Acceptable charge size (refrigerant mass) in a system is also governed by the flammability classification of the fluid, with class 3 fluids, such as ethane, being the most strictly limited. In this case a weaker flammability characteristic is highly desirable since it may allow larger system charges.

Thirdly, the typical application of such fluids is in commercial or laboratory based equipment and so the systems will be located in buildings. It is therefore desirable to have acceptably low toxicity as a characteristic of the fluid.

Furthermore, the volumetric capacity (a measure of the cooling power achievable by a given size of compressor) and energy efficiency are important. This is especially so in cascade operation as inefficiency in the low temperature stage also increases power consumption of the compressor in the top stage of the cascade.

R-170 (ethane) has very low GWP, acceptable refrigeration performance and toxicity but its high flammability limits its application: for example safety regulations can restrict the maximum charge quantity of refrigerant in appliances.

Binary mixtures of R-170 with R-116 have been described by Zhang et al. (J Chem Eng Data 2005 50 2074-2076 and Fluid Phase Equilibria 2006 240 73-78). They identified an azeotropic binary composition of these two components.

R-744 (carbon dioxide) is non-flammable but cannot be used alone in the bottom stage of ULT cascade systems because the operating temperatures are below the triple point of R-744. This means that solid carbon dioxide (dry-ice) could form in low pressure sections of the system, leading to blockages, poor control and inefficient operation.

Binary mixtures of R-744 with R-116 have been described by Valtz et al (Fluid Phase Equilibria 258 (2007) 179-185). They identified an azeotropic binary composition of these two components.

R-1132a (1,1-difluoroethene, also known as vinylidene fluoride) also has low GWP and acceptable toxicity. The flammability of R-1132a is reduced compared to ethane but it is still in flammability class 2. U.S. Pat. No. 6,054,064 describes the use of R-1132a in certain refrigerant compositions including mixtures with R-23, R-32, R-125, R-134a and R-143a. The thermodynamic energy efficiency of pure R-1132a is close to that of R-508 but its refrigeration capacity is reduced.

Thus there is a need to provide alternative refrigerants having improved properties such as low GWP, yet possessing acceptable refrigeration performance, flammability characteristics and toxicology. There is also a need to provide alternative refrigerants that may be used in existing devices such as refrigeration devices with little or no modification.

Figure 1:
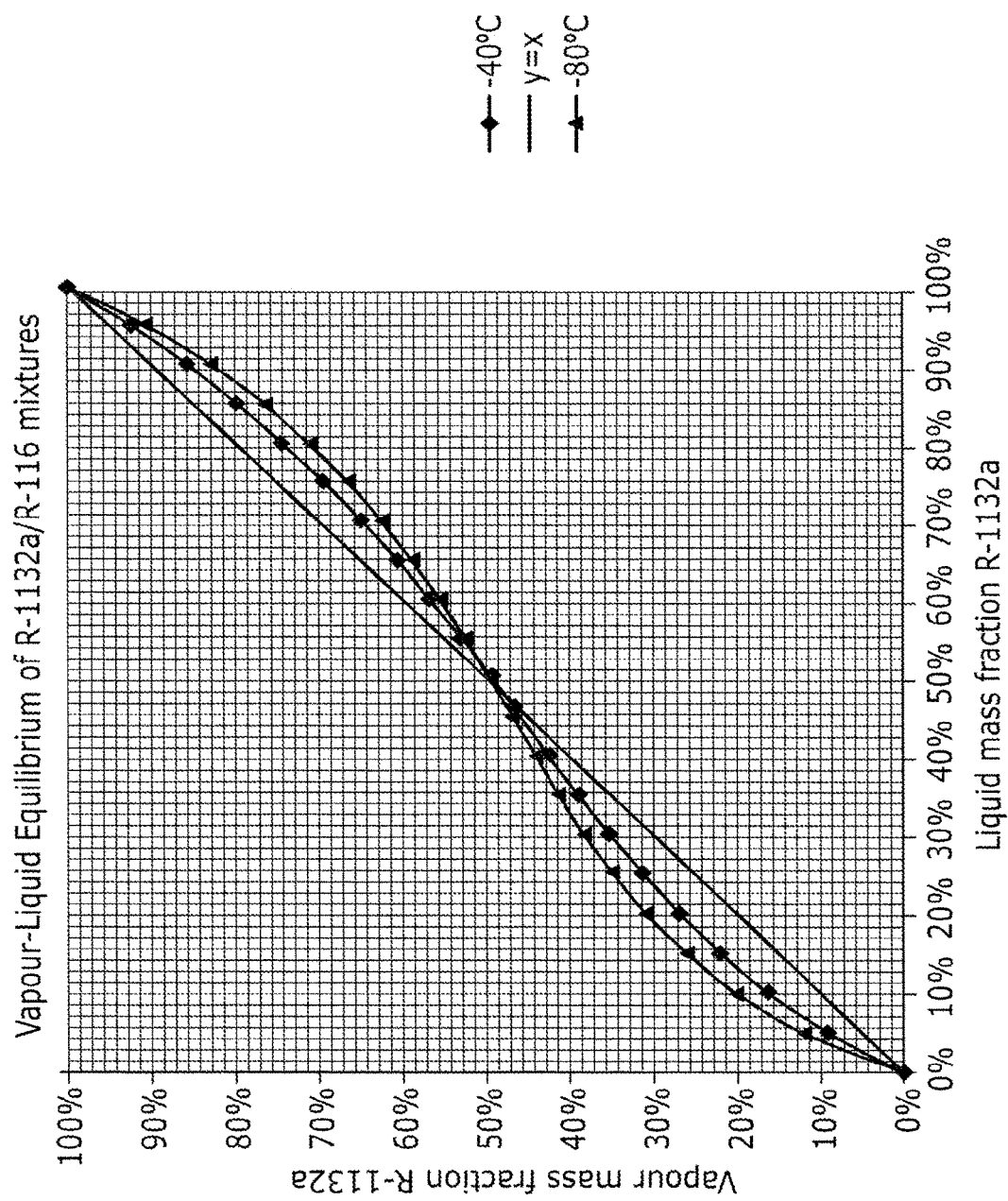
FIG. 1 shows phase equilibrium behavior of R-1132/R-116 mixtures showing azeotropy.

The subject invention addresses the above and other deficiencies by the provision of a composition comprising 1,1-difluoroethene (R-1132a), a second component selected from the group consisting of hexafluoroethane (R-116), ethane (R-170) and mixtures thereof and, optionally, carbon dioxide ($CO_2$, R-744). Such compositions, which may be considered to be heat transfer or refrigerant compositions, are referred to hereinafter as compositions of the invention.

Certain compositions of the invention comprise R-1132a and R-116, typically from about 10 to about 99% by weight of R-1132a and from about 1 to about 90% by weight of R-116. A preferred such composition comprises from about 14 to about 99% by weight of R-1132a and from about 1 to about 86% by weight of R-116.

A another preferred composition of the invention comprises from about 35 to about 99% by weight of R-1132a and from about 1 to about 65% by weight of R-116. Further preferred compositions of the invention comprise from about 36 to about 98% by weight of R-1132a and from about 2 to about 64% by weight of R-116, for example from about 36 to about 96% by weight of R-1132a and from about 4 to about 64% by weight of R-116.

A binary minimum-boiling azeotrope has been identified between R-1132a and R-116 by vapour-liquid equilibrium studies (see the Examples), whose composition at atmospheric pressure is about 50% w/w R-1132a (49.8%), having an atmospheric boiling point of about −85.7° C. The azeotropic composition increases to about 53% w/w R-1132a at 30 bara. Thus, in a preferred embodiment, the invention provides an azeotropic or near-azeotropic composition comprising R-1132a and R-116. A further preferred composition of the invention comprises from about 45 to about 60% by weight of R-1132a and from about 40 to about 55% by weight of R-116.

By azeotropic composition, we include the meaning of a binary composition which at vapour-liquid equilibrium has the same composition in both phases, and whose boiling point is lower than that of either of the pure components. By near-azeotropic composition (e.g. a near-azeotropic composition of R-1132a and R-116), we include the meaning of binary liquid compositions whose vapour pressure is above that of the pure component with the lower boiling point (e.g. R-1132a compared to R-116) when measured at equivalent temperature, but whose equilibrium vapour composition may differ from the liquid composition.

Certain compositions of the invention comprise R-1132a, R-116 and $CO_2$. In an embodiment, such compositions comprise R-1132a, R-116 and up to about 70% by weight $CO_2$.

Advantageous compositions of the invention comprise from about 2 to about 98% by weight of R-1132a, from about 2 to about 98% by weight of R-116 and from about 2 to about 60% by weight $CO_2$.

Preferred compositions of the invention comprise from about 4 to about 96% by weight of R-1132a, from about 4 to about 96% by weight of R-116 and from about 4 to about 50% by weight $CO_2$. Such compositions may contain from about 6 to about 40% by weight $CO_2$, for example from about 8 to about 30% by weight $CO_2$.

In a preferred embodiment, the amount of $CO_2$ in the compositions of the invention is less than about 20% by weight, preferably less than about 15% by weight, for example less than about 13% by weight. It is believed that by limiting the $CO_2$ content to such levels, undesirable dry ice (solid $CO_2$) formation can be reduced or avoided during use of the compositions of the invention as refrigerants.

Further advantageous compositions of the invention contain from about 5 to about 60% by weight of R-1132a, from about 30 to about 70% by weight of R-116 and from about 2 to about 20% by weight $CO_2$. Such compositions typically contain from about 10 to about 50% by weight of R-1132a, from about 40 to about 70% by weight of R-116 and from about 5 to about 15% by weight $CO_2$, or from about 40 to about 60% by weight of R-1132a, from about 35 to about 55% by weight of R-116 and from about 5 to about 20% by weight $CO_2$. In one embodiment, the compositions of the invention contain up to about 35% by weight of R-1132a, at least about 55% by weight of R-116 and up to about 13% by weight $CO_2$.

Certain compositions of the invention comprise R-1132a and ethane (R-170), typically from about 20 to about 99% by weight of R-1132a and from about 1 to about 80% by weight of R-170. A preferred such composition comprises from about 50 to about 99% by weight of R-1132a and from about 1 to about 50% by weight of R-170.

A another preferred composition of the invention comprises from about 75 to about 99% by weight of R-1132a and from about 1 to about 25% by weight of R-170.

A binary minimum-boiling azeotrope has been identified between R-1132a and R-170 by vapour-liquid equilibrium studies (see the Examples), whose composition varies with temperature, from about 54% by weight R-170 at 0° C. to about 41% by weight R-170 at −80° C. In a preferred embodiment, the invention provides an azeotropic or near-azeotropic composition comprising R-1132a and R-170. A further preferred composition of the invention comprises from about 40 to about 60% by weight of R-1132a and from about 40 to about 60% by weight of R-170.

Certain compositions of the invention comprise R-1132a, R-170 and $CO_2$. In an embodiment, such compositions comprise R-1132a, R-170 and up to about 70% by weight $CO_2$.

Advantageous compositions of the invention comprise from about 2 to about 98% by weight of R-1132a, from about 2 to about 98% by weight of R-170 and from about 2 to about 60% by weight $CO_2$.

Preferred compositions of the invention comprise from about 4 to about 96% by weight of R-1132a, from about 4 to about 96% by weight of R-170 and from about 4 to about 50% by weight $CO_2$. Such compositions may contain from about 6 to about 40% by weight $CO_2$, for example from about 8 to about 30% by weight $CO_2$. In one aspect, as previously described, the amount of $CO_2$ in such compositions comprising R-1132a, R-170 and $CO_2$ is less than about 20% by weight, preferably less than about 15% by weight, for example less than about 13% by weight.

Certain compositions of the invention comprise R-1132a, R-116 and R-170.

Advantageous compositions of the invention comprise from about 4 to about 70% by weight of R-1132a, from about 4 to about 96% by weight of R-116 and from about 4 to about 92% by weight R-170.

Preferred compositions of the invention comprise from about 4 to about 70% by weight of R-1132a, from about 4 to about 88% by weight of R-116 and from about 8 to about 92% by weight R-170.

Yet further compositions of the invention consist of quaternary mixtures of ethane, carbon dioxide, R-1132a and R-116. Preferred embodiments of these quaternary compositions are those in which the bulk composition can be assessed as non-flammable by the ASHRAE-34 methodology. Advantageously, the combined amount of ethane and carbon dioxide makes up less than 50% by weight of the composition. Preferably, such compositions contain at least as much $CO_2$ as ethane (by weight), preferably twice as much $CO_2$ as ethane (by weight).

Advantageous compositions comprise from about 2 to about 20% by weight ethane, from about 2 to about 45% by weight $CO_2$, from about 15 to about 85% by weight R-1132a and from about 5 to about 80% by weight R-116. Preferred compositions comprise from about 4 to about 12% by weight ethane, from about 4 to about 40% by weight $CO_2$, from about 20 to about 80% by weight R-1132a and from about 8 to about 76% by weight R-116.

Any of the above described compositions may additionally contain pentafluoroethane (R-125).

Any of the above described compositions may further contain a hydrocarbon, wherein the hydrocarbon is in addition to any ethane present in the composition. Advantageously, the hydrocarbon is one or more compound(s) selected from the group consisting of propane, propene, isobutane, n-butane, n-pentane, isopentane and mixtures thereof. In a preferred embodiment, the hydrocarbon comprises n-pentane.

Without being bound by theory, it is believed that, when present, the inclusion of ethane and/or an additional hydrocarbon compound may enhance oil miscibility, solubility and/or return characteristics. Preferably, the compositions of the invention preferably contain from about 1 to about 50% by weight of the hydrocarbon component, for example from about 1 to about 20%.

All of the chemicals herein described are commercially available. For example, the fluorochemicals may be obtained from Apollo Scientific (UK) and carbon dioxide may be obtained from liquefied gas suppliers such as Linde AG.

As used herein, all % amounts mentioned in compositions herein, including in the claims, are by weight based on the total weight of the compositions, unless otherwise stated.

By the term "about", as used in connection with numerical values of amounts of components in % by weight, we include the meaning of ±0.5% by weight, for example ±0.2% by weight or ±0.1% by weight.

For the avoidance of doubt, it is to be understood that the stated upper and lower values for ranges of amounts of components in the compositions of the invention described herein may be interchanged in any way, provided that the resulting ranges fall within the broadest scope of the invention.

In an embodiment, the compositions of the invention are substantially free of any component that has heat transfer properties (other than the components specified).

For instance, the compositions of the invention may be substantially free of any other hydrofluorocarbon compound (other than R-1132a, R-116 and optionally R-125).

Any of the compositions of the invention described herein, including those with specifically defined amounts of R-1132a, the second component and, optionally, $CO_2$, may consist essentially of (or consist of) the amounts of R-1132a, the second component and, optionally, $CO_2$ defined in those compositions.

By the term "consist essentially of", we include the meaning that the compositions of the invention contain substantially no other components, particularly no further hydrofluorocarbon compounds known to be used in heat transfer compositions (e.g. hydrofluoroalkanes or hydrofluoroalkenes). We include the term "consist of" within the meaning of "consist essentially of".

By "substantially no" and "substantially free of", we include the meaning that the compositions of the invention contain 0.5% by weight or less of the stated component, preferably 0.1% or less, based on the total weight of the composition.

The compositions of the invention have zero ozone depletion potential

Typically, the compositions of the invention have a GWP of less than about 12000, such as less than about 11000.

In one embodiment, the compositions of the invention comprising R-1132a and R-116 have a GWP of less than about 11000, preferably less than about 10500 or about 10000 or about 9000 or about 8000.

In one aspect, the compositions of the invention comprising R-1132a, R-116 and $CO_2$ have a GWP of less than about 11000, for instance less than about 10000, e.g. from about 100 to about 10000, or from about 100 to about 7000

Typically, the compositions of the invention comprising R-1132a and R-170 have a GWP of about 4 or less.

Typically, the compositions of the invention comprising R-1132a, R-170 and $CO_2$ have a GWP of about 4 or less.

In one embodiment, the compositions of the invention comprising R-1132a, R-170, R-116 and $CO_2$ have a GWP of less than about 10000, for instance less than about 9000, e.g. from about 1000 to about 8000, or from about 2000 to about 7000.

Typically, the compositions of the subject invention are of reduced flammability hazards when compared to R-1132a.

Flammability may be determined in accordance with ASHRAE Standard 34 incorporating the ASTM Standard E-681 with test methodology as per Addendum 34p dated 2004, the entire content of which is incorporated herein by reference.

In one aspect, the compositions have one or more of (a) a higher lower flammable limit; (b) a higher ignition energy (sometimes referred to as auto ignition energy or pyrolysis); or (c) a lower flame velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or flame speed. The flammable limits being determined according to the methods specified in ASHRAE-34 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

Certain non-flammable compositions of the invention are described in the Examples. A preferred non-flammable composition of the invention comprises (optionally consists essentially of or consists of) up to about 30% by weight R-1132a and at least about 70% by weight R116.

In some applications it may not be necessary for the formulation to be classed as non-flammable by the ASHRAE-34 methodology; it is possible to develop fluids whose flammability limits will be sufficiently reduced in air to render them safe for use in the application, for example if it is physically not possible to make a flammable mixture by leaking the refrigeration equipment charge into the surrounds. Certain such reduced flammability compositions of the invention are described in the Examples.

In one embodiment, the compositions of the invention have a flammability classifiable as 1 or 2 L according to the ASHRAE standard 34 classification method The compositions of the invention, particularly those comprising R-1132a, R-116 and $CO_2$, advantageously have a temperature glide in an evaporator or a condenser of less than 10 K. Preferably such compositions have a temperature glide of less than about 5 K, and even more preferably less than about 1 K.

The critical temperature of a heat transfer composition should be higher than the maximum expected condenser temperature. This is because the cycle efficiency drops as critical temperature is approached. As this happens, the latent heat of the refrigerant is reduced and so more of the heat rejection in the condenser takes place by cooling gaseous refrigerant; this requires more area per unit heat transferred. The critical temperature of R-508B is about 11° C. (data estimated by REFPROP).

In one aspect, the compositions of the invention have a critical temperature of greater than about 0° C., preferably greater than about 11° C.

It is believed that the compositions of the invention exhibit a completely unexpected combination of low-/non-flammability, low GWP, improved lubricant miscibility and improved refrigeration performance properties. Some of these refrigeration performance properties are explained in more detail below.

The compositions of the invention typically have a volumetric refrigeration capacity that is at least 85% of that of R-508. Preferably, the compositions of the invention have a volumetric refrigeration capacity that is at least 90% of that of R-508, for example from about 95% to about 120% of that of R-508

The compositions of the invention typically are capable of reaching temperatures of −70° C. or lower, preferably −80° C. or lower, for example −85° C. or lower whilst maintain the evaporation pressure above atmospheric pressure.

In one embodiment, the cycle efficiency (Coefficient of Performance, COP) of the compositions of the invention is within about 5% or even better than the existing refrigerant fluid it is replacing. Conveniently, the compressor discharge temperature of the compositions of the invention is within about 15K of the existing refrigerant fluid it is replacing, preferably about 10K or even about 5K.

The compositions of the invention are typically suitable for use in existing designs of equipment, for example, ULT refrigeration equipment and are compatible with all classes of lubricant currently used with established HFC refrigerants. They may be optionally stabilised or compatibilised with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof. PAGs and POEs are currently preferred lubricants for the compositions of the invention.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In one embodiment, the invention provides a heat transfer device comprising a composition of the invention.

Preferably, the heat transfer device is a refrigeration device.

Conveniently, the heat transfer device is an ultra-low temperature refrigeration system.

Advantageously, the heat transfer device contains a cascade system.

The invention also provides the use of a composition of the invention in a heat transfer device as herein described.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device, more preferably still the device is an ultra-low temperature refrigeration system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a, the second component (and optional components such as R-744, R-125, hydrocarbons, a lubricant, a stabiliser or an additional flame retardant) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, aerosols or sprayable propellants, gaseous dielectrics, flame suppression, solvents (e.g. carriers for flavorings and fragrances), cleaners, topical anesthetics, and expansion applications. Preferably, the field is ultra-low temperature refrigeration.

Examples of suitable products include heat transfer devices, sprayable compositions, solvents and mechanical power generation devices. In a preferred embodiment, the product is a heat transfer device, such as a refrigeration device or an ultra-low temperature refrigeration system.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluorocarbon compound or it may comprise a fluorinated olefin.

Preferably, the existing compound or composition is a heat transfer compound or composition such as a refrigerant. Examples of refrigerants that may be replaced include ULT refrigerants such as R-508A, R-508B, R23 and R13B1.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples.

EXAMPLES

Binary Mixtures of R-1132a and R-116

A binary minimum-boiling azeotrope between R-1132a and R-116 was identified by study of the vapour-liquid equilibrium of binary mixtures over a temperature range of −70° C. to 0° C. using a constant-volume apparatus. The data thus generated were regressed to a thermodynamic model capable of extrapolation from the measurement temperature/pressure range to atmospheric pressure conditions.

The experimental data were measured in a static constant-volume apparatus consisting of a vessel of precisely-known internal volume located in a temperature-controlled metal block. A magnetic stirring device was located inside the vessel. Refrigerated fluid was passed through the block to allow precise control of temperature inside the vessel. The cell was evacuated then known amounts of each component were then charged to the cell. The temperature of the cell was then varied stepwise from about −70° C. to 0° C. At each temperature the cell temperature and pressure were logged continuously and recorded when stable conditions were reached.

The resulting datasets were then regressed using Barker's method (as described in *The Properties of Gases and Liquids* $3^{rd}$ *edition* (Reid, Sherwood & Prausnitz), which is incorporated herein by reference) to a thermodynamic model capable of representing non-ideal vapour liquid equilibria. The model used the Redlich Kwong equation of state to represent the gas phase properties and the Wilson equation to represent the non-ideality of the liquid phase mixture, as described in Reid et al.

Figure 2:
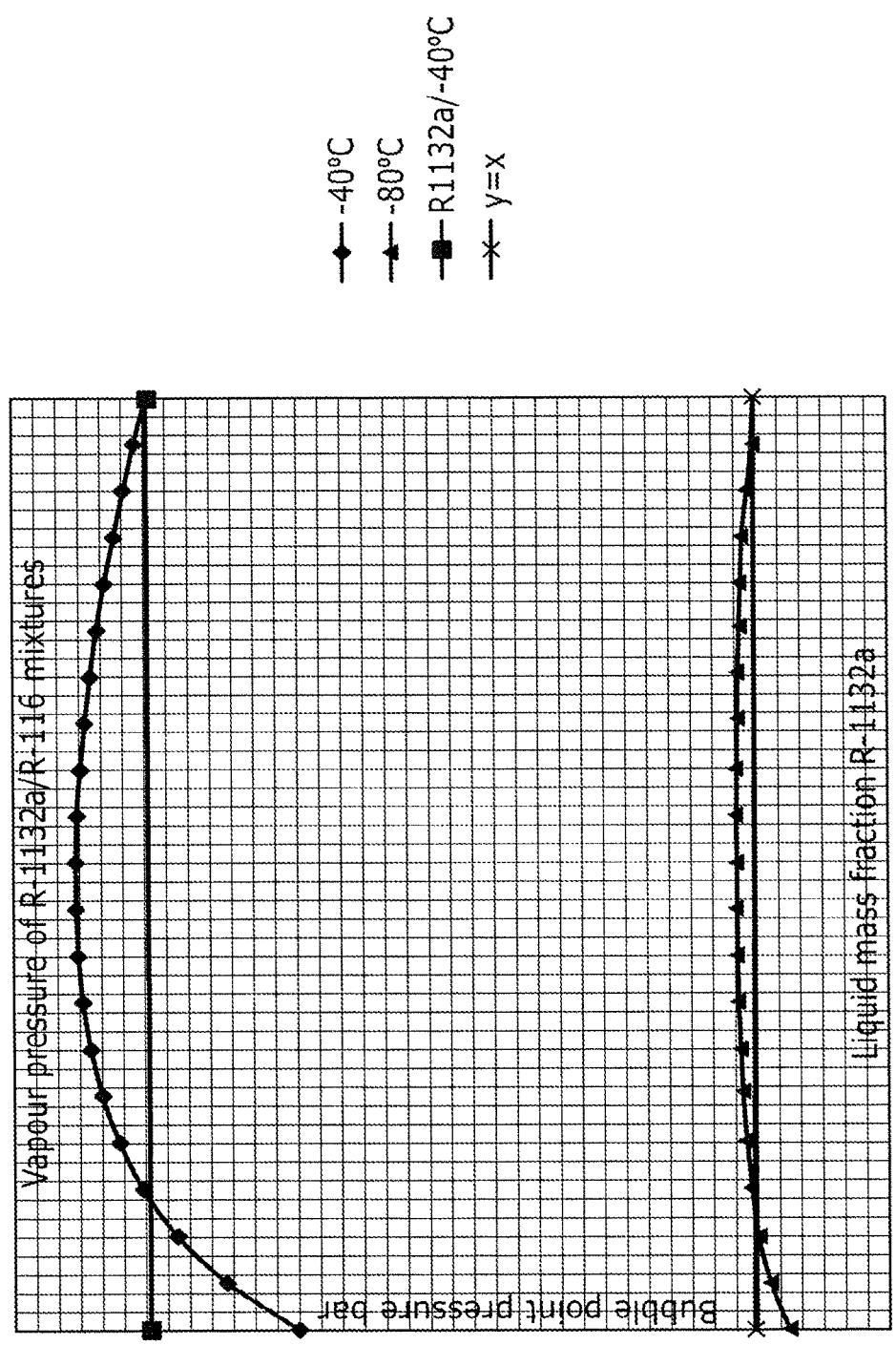
FIG. 2 shows vapour pressure of R-1132a/R-116 mixtures.

The phase behaviour of this system is illustrated in FIGS. 1 and 2. FIG. 1 shows the vapour composition in the mixture (inferred using the regressed model) plotted against the equilibrium liquid composition. It is seen that the azeotropic point (where the vapour and liquid compositions coincide) moves with pressure, increasing in R-1132a content.

A feature of the R-1132a/R-116 binary system identified is that the vapour pressure of any binary mixture containing more than about 14% w/w R-1132a is equal to or higher than the vapour pressure of R-1132a itself (the more volatile component of the system). This is illustrated in FIG. 2. This means that the refrigeration performance of binary mixtures of the fluids is unexpectedly enhanced compared to that which could be expected from considering the fluid as an ideal binary mixture. In particular we have found that compositions of more than about 35% w/w R-1132a will exhibit higher refrigeration capacity and improved volumetric compressor efficiency than pure R-1132a in typical low temperature refrigeration cycle conditions.

Figure 3:
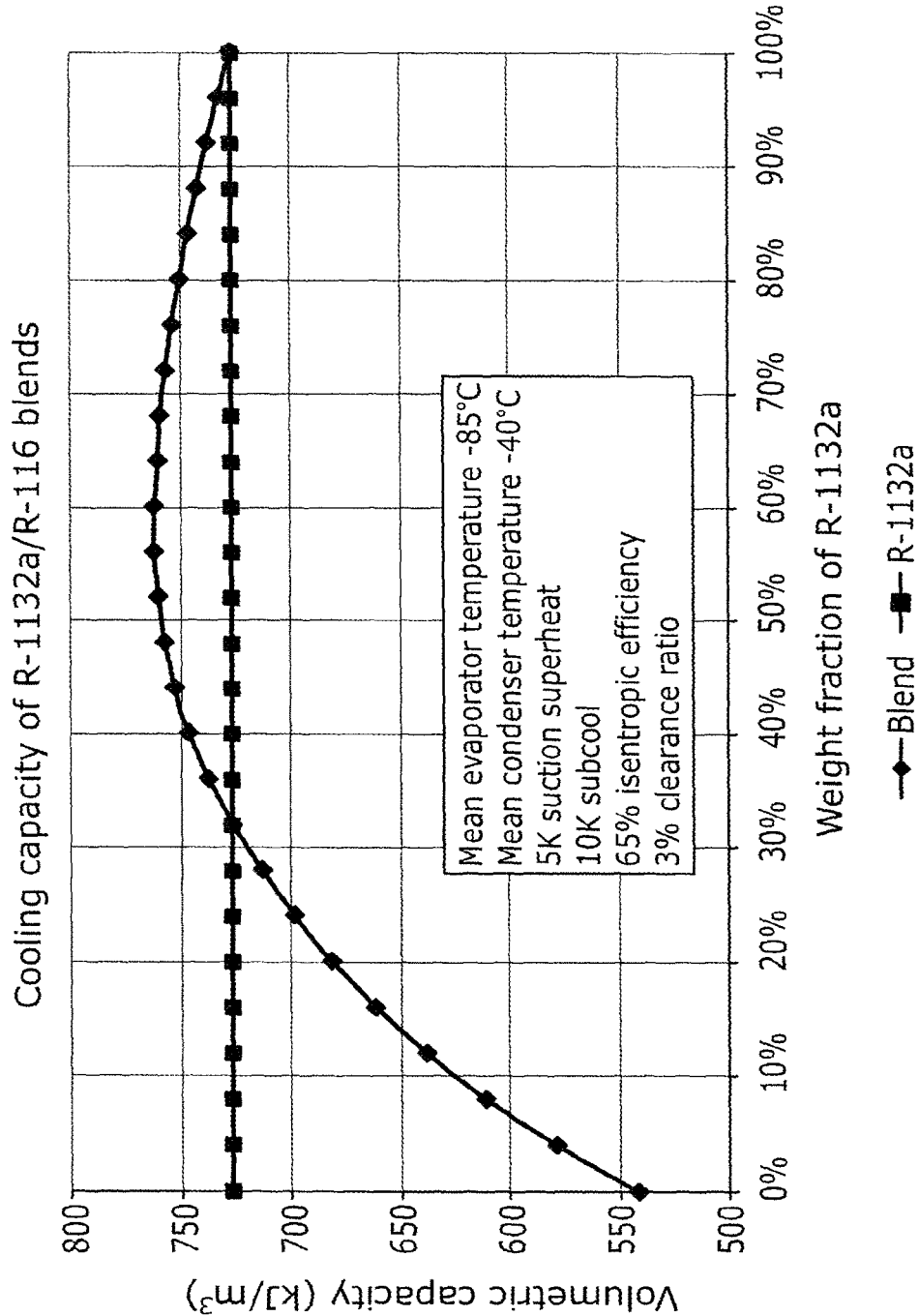
FIG. 3 shows calculated refrigeration cycle performance for R-1132a/R-116 mixtures.

FIG. 3 shows calculated refrigeration cycle performance for binary compositions of the invention, with vapour liquid equilibrium modelled based on the measured phase equilibrium, together with a comparison made to the same compositions assuming Raoult's Law (ideal) behaviour. The thermodynamic properties of R-116 used in this cycle modelling were taken from the NIST REFPROP software version 8. Properties of R-1132a were taken from available open literature data with the exception of saturated liquid vapour pressure, which was measured by us in the determination of the phase equilibrium data. The main source of data for R-1132a physical properties was the commercial PPDS thermodynamic data package provided by TUV-NEL, augmented with data from the commercial DECHEMA database.

The cycle conditions for the modelling were as follows.

TABLE 1

Cycle conditions for R-1132a/R-116 binary system modelling

| Cycle conditions for modelling | | |
|---|---|---|
| Condensing temperature | ° C. | −40 |
| Evaporating temperature | ° C. | −85 |
| Suction temperature | ° C. | −40 |
| Isentropic efficiency | | 65% |
| Subcooling | K | 5 |
| Evaporator superheat | K | 5 |
| Compressor clearance ratio | | 4% |

The modelled data is set out in the following table. The GWP values for the binary mixtures shown are calculated on the basis of GWP values of 4 and 12200 for R-1132a and R-116, respectively. By way of reference, the corresponding volumetric capacity for pure R-1132a using the same calculations is 726.

TABLE 2

Refrigeration performance modelling data for R-1132a/R-116 binary system

| | | R1132a (weight %) | | | | | |
|---|---|---|---|---|---|---|---|
| | | 4% | 8% | 12% | 16% | 20% | 24% |
| | | R116 (weight %) | | | | | |
| | | 96.00% | 92.00% | 88.00% | 84.00% | 80.00% | 76.00% |
| GWP | | 11712 | 11224 | 10736 | 10249 | 9761 | 9273 |
| Evaporator pressure | bar | 0.75 | 0.80 | 0.85 | 0.89 | 0.93 | 0.96 |
| Condenser pressure | bar | 5.82 | 6.16 | 6.44 | 6.68 | 6.87 | 7.04 |
| Pressure ratio | | 7.78 | 7.68 | 7.57 | 7.47 | 7.39 | 7.31 |
| Volumetric efficiency | | 84.2% | 84.6% | 84.9% | 85.3% | 85.6% | 85.8% |
| Discharge temperature | ° C. | −12.1 | −10.5 | −9.3 | −8.2 | −7.2 | −6.4 |
| Volumetric flowrate | m³/hr | 62.2 | 58.9 | 56.4 | 54.5 | 52.9 | 51.6 |
| Evaporator temp glide | K | 0.8 | 1.3 | 1.6 | 1.6 | 1.4 | 1.2 |
| Condenser temp glide | K | 1.2 | 1.7 | 1.8 | 1.6 | 1.3 | 1.0 |
| Volumetric capacity | kJ/m³ | 579 | 611 | 638 | 661 | 681 | 698 |
| Cooling COP | | 2.29 | 2.26 | 2.24 | 2.21 | 2.20 | 2.19 |
| | | R1132a (weight %) | | | | | |
| | | 28% | 32% | 36% | 40% | 44% | 48% |
| | | R116 (weight %) | | | | | |
| | | 72.00% | 68.00% | 64.00% | 60.00% | 56.00% | 52.00% |
| GWP | | 8785 | 8297 | 7809 | 7322 | 6834 | 6346 |
| Evaporator pressure | bar | 0.99 | 1.01 | 1.03 | 1.04 | 1.05 | 1.05 |
| Condenser pressure | bar | 7.17 | 7.27 | 7.34 | 7.39 | 7.41 | 7.42 |
| Pressure ratio | | 7.24 | 7.18 | 7.14 | 7.10 | 7.07 | 7.05 |
| Volumetric efficiency | | 86.1% | 86.3% | 86.5% | 86.7% | 86.8% | 86.9% |
| Discharge temperature | ° C. | −5.5 | −4.7 | −3.9 | −3.1 | −2.2 | −1.3 |
| Volumetric flowrate | m³/hr | 50.5 | 49.6 | 48.9 | 48.3 | 47.9 | 47.6 |
| Evaporator temp glide | K | 0.9 | 0.6 | 0.4 | 0.2 | 0.1 | 0.0 |
| Condenser temp glide | K | 0.7 | 0.4 | 0.2 | 0.1 | 0.0 | 0.0 |
| Volumetric capacity | kJ/m³ | 713 | 726 | 737 | 746 | 752 | 757 |
| Cooling COP | | 2.18 | 2.17 | 2.17 | 2.17 | 2.17 | 2.18 |

TABLE 2-continued

Refrigeration performance modelling data for R-1132a/R-116 binary system

| | | R1132a (weight %) | | | | | |
|---|---|---|---|---|---|---|---|
| | | 52% | 56% | 60% | 64% | 68% | 72% |
| | | R116 (weight %) | | | | | |
| | | 48.00% | 44.00% | 40.00% | 36.00% | 32.00% | 28.00% |
| GWP | | 5858 | 5370 | 4882 | 4395 | 3907 | 3419 |
| Evaporator pressure | bar | 1.05 | 1.05 | 1.04 | 1.04 | 1.03 | 1.02 |
| Condenser pressure | bar | 7.41 | 7.39 | 7.36 | 7.32 | 7.27 | 7.22 |
| Pressure ratio | | 7.05 | 7.05 | 7.06 | 7.07 | 7.08 | 7.10 |
| Volumetric efficiency | | 87.0% | 87.1% | 87.2% | 87.2% | 87.3% | 87.3% |
| Discharge temperature | ° C. | −0.3 | 0.7 | 1.7 | 2.7 | 3.7 | 4.7 |
| Volumetric flowrate | m³/hr | 47.4 | 47.3 | 47.3 | 47.4 | 47.5 | 47.6 |
| Evaporator temp glide | K | 0.0 | 0.1 | 0.1 | 0.2 | 0.3 | 0.3 |
| Condenser temp glide | K | 0.0 | 0.1 | 0.1 | 0.2 | 0.3 | 0.3 |
| Volumetric capacity | kJ/m³ | 760 | 761 | 761 | 760 | 758 | 756 |
| Cooling COP | | 2.18 | 2.19 | 2.19 | 2.20 | 2.20 | 2.21 |
| | | R1132a (weight %) | | | | | |
| | | 76% | 80% | 84% | 88% | 92% | 96% |
| | | R116 (weight %) | | | | | |
| | | 24.00% | 20.00% | 16.00% | 12.00% | 8.00% | 4.00% |
| GWP | | 2931 | 2443 | 1955 | 1468 | 980 | 492 |
| Evaporator pressure | bar | 1.01 | 0.99 | 0.98 | 0.97 | 0.96 | 0.94 |
| Condenser pressure | bar | 7.16 | 7.10 | 7.04 | 6.97 | 6.90 | 6.83 |
| Pressure ratio | | 7.12 | 7.14 | 7.16 | 7.19 | 7.21 | 7.24 |
| Volumetric efficiency | | 87.4% | 87.4% | 87.4% | 87.4% | 87.4% | 87.4% |
| Discharge temperature | ° C. | 5.7 | 6.6 | 7.5 | 8.4 | 9.2 | 10.0 |
| Volumetric flowrate | m³/hr | 47.8 | 48.0 | 48.3 | 48.6 | 48.9 | 49.2 |
| Evaporator temp glide | K | 0.4 | 0.4 | 0.4 | 0.3 | 0.2 | 0.1 |
| Condenser temp glide | K | 0.4 | 0.4 | 0.4 | 0.3 | 0.2 | 0.1 |
| Volumetric capacity | kJ/m³ | 753 | 750 | 746 | 741 | 737 | 731 |
| Cooling COP | | 2.22 | 2.22 | 2.23 | 2.24 | 2.24 | 2.25 |

The data show that for compositions between about 32% and 76% R-1132a the evaporation pressure is greater than atmospheric pressure and the cooling capacity is greater than that of R-1132a alone.

Binary Mixtures of R-170 and R-1132a

Figure 4:
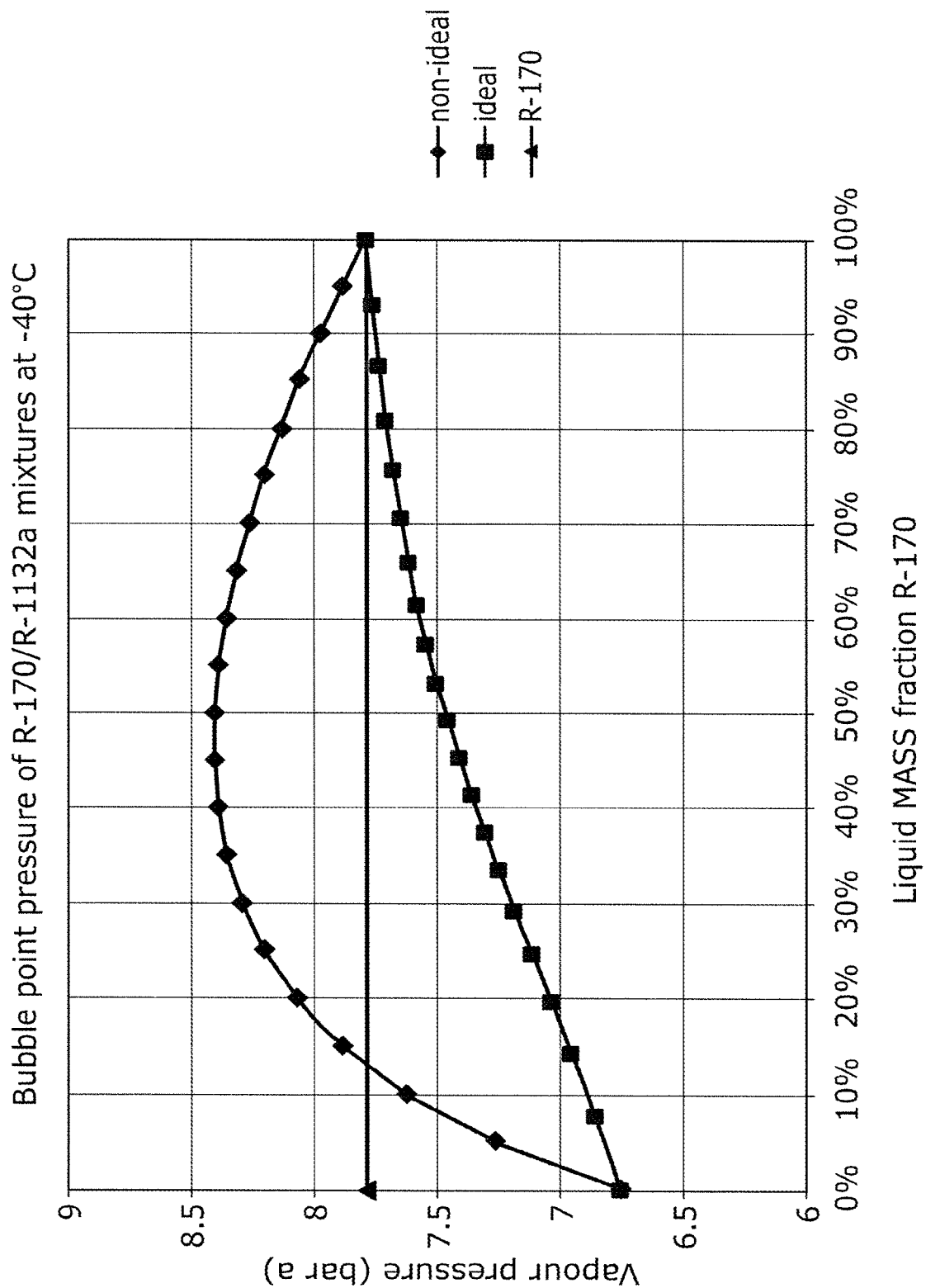
FIG. 4 shows bubble point pressure of R-170/R-1132a mixtures at −40° C.

The phase equilibrium behaviour of mixtures of ethane and R-1132a was studied in the temperature range −80 to 0° C. using data generated using PHYSPACK-PPB with WERK streamtype and binary interaction parameters optimised to fit Mexichem VLE data. The results are shown in the table below and the bubble point pressure of R-170/R-1132a mixtures at −40° C. is shown in FIG. 4.

TABLE 3

Binary VLE data for R-170/R-1132a mixtures

| Stream Temperature ° C. | Stream Molar VF | Liq Mass Fr ETHANE | Vap Mass Fr ETHANE | Bubble Point Pressure bar | Ideal bubble pressure bar |
|---|---|---|---|---|---|
| −80 | 0 | 0 | 0 | 1.21798 | 1.21798 |
| −80 | 0 | 0.05 | 0.0972247 | 1.35928 | 1.25446 |
| −80 | 0 | 0.1 | 0.171521 | 1.45689 | 1.28723 |
| −80 | 0 | 0.15 | 0.231542 | 1.52581 | 1.31683 |
| −80 | 0 | 0.2 | 0.282277 | 1.57523 | 1.34371 |
| −80 | 0 | 0.25 | 0.32683 | 1.61097 | 1.36822 |
| −80 | 0 | 0.3 | 0.367258 | 1.6368 | 1.39066 |
| −80 | 0 | 0.35 | 0.405006 | 1.65522 | 1.41128 |
| −80 | 0 | 0.4 | 0.441142 | 1.6679 | 1.4303 |
| −80 | 0 | 0.45 | 0.476504 | 1.67597 | 1.4479 |
| −80 | 0 | 0.5 | 0.511787 | 1.68023 | 1.46422 |
| −80 | 0 | 0.55 | 0.5476 | 1.68123 | 1.47941 |
| −80 | 0 | 0.6 | 0.584512 | 1.67933 | 1.49358 |

TABLE 3-continued

Binary VLE data for R-170/R-1132a mixtures

| Stream Temperature ° C. | Stream Molar VF | Liq Mass Fr ETHANE | Vap Mass Fr ETHANE | Bubble Point Pressure bar | Ideal bubble pressure bar |
|---|---|---|---|---|---|
| −80 | 0 | 0.65 | 0.623085 | 1.67481 | 1.50682 |
| −80 | 0 | 0.7 | 0.663903 | 1.66785 | 1.51923 |
| −80 | 0 | 0.75 | 0.707603 | 1.65859 | 1.53087 |
| −80 | 0 | 0.8 | 0.754905 | 1.6471 | 1.54183 |
| −80 | 0 | 0.85 | 0.806652 | 1.63345 | 1.55216 |
| −80 | 0 | 0.9 | 0.86386 | 1.61768 | 1.5619 |
| −80 | 0 | 0.95 | 0.927781 | 1.5998 | 1.57112 |
| −80 | 0 | 1 | 1 | 1.57985 | 1.57985 |
| −40 | 0 | 0 | 0 | 6.75403 | 6.75403 |
| −40 | 0 | 0.05 | 0.077327 | 7.26181 | 6.85829 |
| −40 | 0 | 0.1 | 0.141724 | 7.62444 | 6.95196 |
| −40 | 0 | 0.15 | 0.197337 | 7.88483 | 7.03659 |
| −40 | 0 | 0.2 | 0.246867 | 8.07158 | 7.11342 |
| −40 | 0 | 0.25 | 0.29217 | 8.20405 | 7.18348 |
| −40 | 0 | 0.3 | 0.334581 | 8.29553 | 7.24763 |
| −40 | 0 | 0.35 | 0.375101 | 8.35529 | 7.30658 |
| −40 | 0 | 0.4 | 0.414517 | 8.3899 | 7.36095 |
| −40 | 0 | 0.45 | 0.453476 | 8.40407 | 7.41125 |
| −40 | 0 | 0.5 | 0.492531 | 8.40124 | 7.45792 |
| −40 | 0 | 0.55 | 0.532183 | 8.38395 | 7.50133 |
| −40 | 0 | 0.6 | 0.572899 | 8.35411 | 7.54182 |
| −40 | 0 | 0.65 | 0.615145 | 8.31317 | 7.57967 |
| −40 | 0 | 0.7 | 0.659393 | 8.26228 | 7.61514 |
| −40 | 0 | 0.75 | 0.706148 | 8.20233 | 7.64844 |
| −40 | 0 | 0.8 | 0.755966 | 8.13405 | 7.67976 |
| −40 | 0 | 0.85 | 0.809469 | 8.05804 | 7.70927 |
| −40 | 0 | 0.9 | 0.867381 | 7.97481 | 7.73713 |
| −40 | 0 | 0.95 | 0.930551 | 7.88481 | 7.76348 |

TABLE 3-continued

Binary VLE data for R-170/R-1132a mixtures

| Stream Temperature ° C. | Stream Molar VF | Liq Mass Fr ETHANE | Vap Mass Fr ETHANE | Bubble Point Pressure bar | Ideal bubble pressure bar |
|---|---|---|---|---|---|
| −40 | 0 | 1 | 1 | 7.78842 | 7.78842 |
| 0 | 0 | 0 | 0 | 22.1119 | 22.1119 |
| 0 | 0 | 0.05 | 0.0634704 | 23.2491 | 22.299 |
| 0 | 0 | 0.1 | 0.12047 | 24.0949 | 22.4671 |
| 0 | 0 | 0.15 | 0.17285 | 24.7165 | 22.619 |
| 0 | 0 | 0.2 | 0.221933 | 25.1633 | 22.7568 |
| 0 | 0 | 0.25 | 0.268696 | 25.4729 | 22.8825 |
| 0 | 0 | 0.3 | 0.31388 | 25.6739 | 22.9977 |
| 0 | 0 | 0.35 | 0.358073 | 25.7881 | 23.1035 |
| 0 | 0 | 0.4 | 0.401746 | 25.8327 | 23.201 |
| 0 | 0 | 0.45 | 0.445298 | 25.8214 | 23.2913 |
| 0 | 0 | 0.5 | 0.489069 | 25.7646 | 23.375 |
| 0 | 0 | 0.55 | 0.533365 | 25.671 | 23.4529 |
| 0 | 0 | 0.6 | 0.578466 | 25.5474 | 23.5256 |
| 0 | 0 | 0.65 | 0.624636 | 25.3992 | 23.5935 |
| 0 | 0 | 0.7 | 0.672132 | 25.2311 | 23.6572 |
| 0 | 0 | 0.75 | 0.721212 | 25.0465 | 23.7169 |
| 0 | 0 | 0.8 | 0.772136 | 24.8487 | 23.7731 |
| 0 | 0 | 0.85 | 0.825178 | 24.64 | 23.8261 |
| 0 | 0 | 0.9 | 0.880625 | 24.4226 | 23.8761 |
| 0 | 0 | 0.95 | 0.938786 | 24.1981 | 23.9234 |
| 0 | 0 | 1 | 1 | 23.9681 | 23.9681 |

The cycle conditions for the following modelling of R-1132a/R-170 blends were as shown above for the modelling on the R-1132a/R-116 blends. The modelled data is set out in the following table. The table also includes the corresponding modelled data for R508B alone, R-1132a alone and R-116 alone.

TABLE 4

Refrigeration performance modelling data for R-1132a/R-170 binary system

| | | R170 (weight %) | | | | | | |
|---|---|---|---|---|---|---|---|---|
| | | 4% | 8% | 12% | 16% | 20% | 24% | 28% |
| | | R1132a (weight %) | | | | | | |
| | | 96.00% | 92.00% | 88.00% | 84.00% | 80.00% | 76.00% | 72.00% |
| GWP | | 4 | 4 | 4 | 4 | 4 | 4 | 4 |
| Evaporator pressure | bar | 0.99 | 1.05 | 1.10 | 1.14 | 1.18 | 1.21 | 1.23 |
| Condenser pressure | bar | 7.10 | 7.39 | 7.62 | 7.82 | 7.98 | 8.11 | 8.22 |
| Pressure ratio | | 7.15 | 7.04 | 6.95 | 6.86 | 6.79 | 6.72 | 6.66 |
| Volumetric efficiency | | 87.8% | 88.1% | 88.3% | 88.6% | 88.8% | 89.0% | 89.2% |
| Discharge temperature | ° C. | 12.6 | 14.2 | 15.6 | 16.9 | 18.1 | 19.3 | 20.4 |
| Evaporator temp glide | K | 0.6 | 0.9 | 1.1 | 1.1 | 1.0 | 0.8 | 0.6 |
| Condenser temp glide | K | 0.6 | 0.9 | 0.9 | 0.8 | 0.7 | 0.5 | 0.3 |
| Volumetric capacity | kJ/m³ | 778 | 822 | 861 | 895 | 923 | 948 | 968 |
| Cooling COP | | 2.28 | 2.30 | 2.31 | 2.32 | 2.33 | 2.34 | 2.34 |

| | | R170 (weight %) | | | | | | |
|---|---|---|---|---|---|---|---|---|
| | | 32% | 36% | 40% | 44% | 48% | 52% | 56% |
| | | R1132a (weight %) | | | | | | |
| | | 68.00% | 64.00% | 60.00% | 56.00% | 52.00% | 48.00% | 44.00% |
| GWP | | 4 | 4 | 4 | 4 | 4 | 3 | 3 |
| Evaporator pressure | bar | 1.25 | 1.27 | 1.29 | 1.29 | 1.30 | 1.30 | 1.30 |
| Condenser pressure | bar | 8.30 | 8.35 | 8.38 | 8.40 | 8.40 | 8.39 | 8.37 |
| Pressure ratio | | 6.61 | 6.57 | 6.52 | 6.49 | 6.46 | 6.44 | 6.42 |
| Volumetric efficiency | | 89.4% | 89.6% | 89.7% | 89.8% | 90.0% | 90.1% | 90.2% |
| Discharge temperature | ° C. | 21.5 | 22.6 | 23.7 | 24.8 | 25.9 | 27.0 | 28.1 |
| Evaporator temp glide | K | 0.5 | 0.3 | 0.2 | 0.1 | 0.0 | 0.0 | 0.0 |
| Condenser temp glide | K | 0.2 | 0.1 | 0.0 | 0.0 | 0.0 | 0.0 | 0.1 |
| Volumetric capacity | kJ/m³ | 985 | 999 | 1009 | 1017 | 1022 | 1025 | 1025 |

TABLE 4-continued

Refrigeration performance modelling data for R-1132a/R-170 binary system

| Cooling COP | | 2.35 | 2.35 | 2.36 | 2.36 | 2.36 | 2.36 | 2.36 |
|---|---|---|---|---|---|---|---|---|

| | | \multicolumn{7}{c}{R170 (weight %)} |
|---|---|---|---|---|---|---|---|---|
| | | 60% | 64% | 68% | 72% | 76% | 80% | 84% |
| | | \multicolumn{7}{c}{R1132a (weight %)} |
| | | 40.00% | 36.00% | 32.00% | 28.00% | 24.00% | 20.00% | 16.00% |
| GWP | | 3 | 3 | 3 | 3 | 3 | 3 | 3 |
| Evaporator pressure | bar | 1.30 | 1.30 | 1.30 | 1.29 | 1.28 | 1.28 | 1.27 |
| Condenser pressure | bar | 8.34 | 8.30 | 8.26 | 8.21 | 8.16 | 8.10 | 8.04 |
| Pressure ratio | | 6.40 | 6.39 | 6.38 | 6.37 | 6.36 | 6.35 | 6.35 |
| Volumetric efficiency | | 90.3% | 90.4% | 90.4% | 90.5% | 90.6% | 90.7% | 90.7% |
| Discharge temperature | °C. | 29.2 | 30.3 | 31.4 | 32.5 | 33.6 | 34.6 | 35.6 |
| Evaporator temp glide | K | 0.0 | 0.0 | 0.1 | 0.1 | 0.1 | 0.1 | 0.0 |
| Condenser temp glide | K | 0.1 | 0.1 | 0.2 | 0.2 | 0.2 | 0.2 | 0.2 |
| Volumetric capacity | kJ/m$^3$ | 1024 | 1022 | 1018 | 1014 | 1008 | 1002 | 995 |
| Cooling COP | | 2.36 | 2.35 | 2.35 | 2.35 | 2.34 | 2.34 | 2.34 |

| | | \multicolumn{3}{c}{R170 (weight %)} | | | |
|---|---|---|---|---|---|---|---|
| | | 88% | 92% | 96% | | | |
| | | \multicolumn{3}{c}{R1132a (weight %)} | | | |
| | | 12.00% | 8.00% | 4.00% | R508B | R1132a | R116 |
| GWP | | 3 | 3 | 3 | 13212 | 4 | 12200 |
| Evaporator pressure | bar | 1.26 | 1.25 | 1.24 | 1.23 | 0.93 | 0.69 |
| Condenser pressure | bar | 7.98 | 7.92 | 7.85 | 8.73 | 6.75 | 5.40 |
| Pressure ratio | | 6.34 | 6.34 | 6.34 | 7.12 | 7.26 | 7.85 |
| Volumetric efficiency | | 90.8% | 90.8% | 90.9% | 87.7% | 87.5% | 84.0% |
| Discharge temperature | °C. | 36.6 | 37.6 | 38.5 | 11.8 | 10.8 | −14.0 |
| Evaporator temp glide | K | 0.1 | 0.1 | 0.0 | 0.1 | 0.0 | 0.0 |
| Condenser temp glide | K | 0.2 | 0.2 | 0.1 | 0.1 | 0.0 | 0.0 |
| Volumetric capacity | kJ/m$^3$ | 988 | 981 | 973 | 955 | 726 | 542 |
| Cooling COP | | 2.33 | 2.33 | 2.32 | 2.30 | 2.26 | 2.32 |

Ternary Mixtures of R-744, R-1132a and R-116

Ternary compositions of carbon dioxide (R-744) with R-1132a and R-116 have been identified which exhibit further enhanced refrigeration capacity and reduced flammability compared to R-1132a. These have the advantageous features that solid carbon dioxide formation in the low pressure parts of the refrigeration system can be avoided and that lower compressor discharge temperatures than those attainable with binary R-744/R-1132a mixtures).

It is known in the thermodynamic literature (Valtz et al. Fluid Phase Equilibria 258 (2007) 179-185, which is incorporated herein by reference) that the binary system of R-744/R-116 exhibits azeotropy at temperatures at least above −20° C. It has been found, surprisingly, that addition of R-744 to R-1132a and R-116 system significantly enhances the refrigeration capacity of the resulting mixture by more than would be expected if the mixture were an ideal mixture. In particular, regions of composition have been identified where the ternary mixtures exhibits no or very low temperature glide in the two-phase region and only very small differences in phase composition.

The performance of selected ternary R-1132a/R-116/CO$_2$ compositions was modelled using the same cycle conditions and thermodynamic model as explained in the previous examples. The VLE behaviour of the three binary mixtures (R-744/R-116, R-744/R-1132a, R-1132a/R-116) was regressed into the selected thermodynamic model and this was then used to estimate performance. The data of Valtz were incorporated into this regression.

Figure 5:
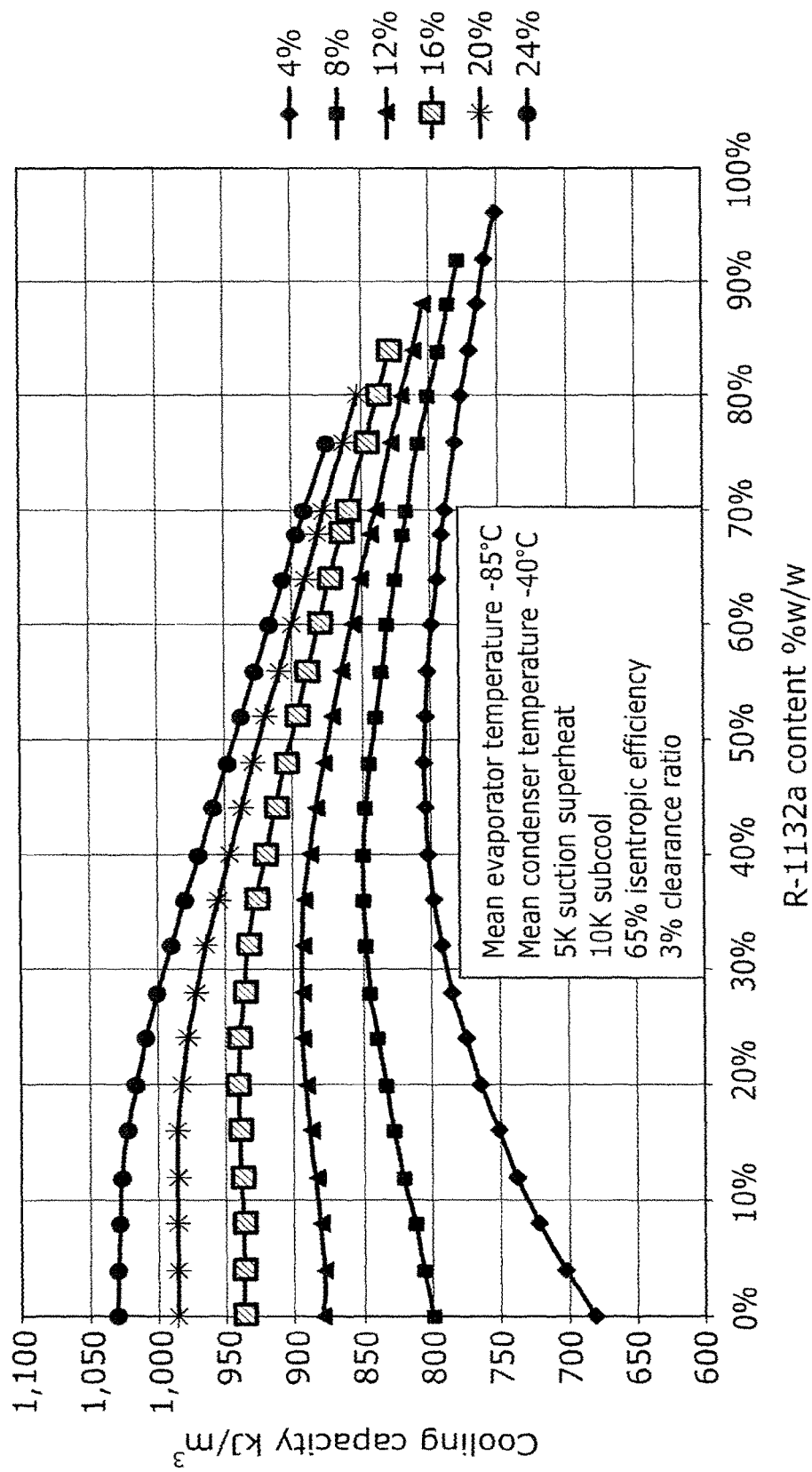
FIG. 5 shows calculated refrigeration cycle performance for R-1132a/R-116/R-744 mixtures.

The modelled data is set out in the following tables. The corresponding modelled data for R508B alone, R-1132a alone and R-116 alone is shown above in Table 4. The volumetric cooling capacity of selected R-1132a/R-116/CO$_2$ blends is illustrated in FIG. 5.

Selected R-1132a/R-116/CO$_2$ blends of the invention offer an unexpected combination of benefits compared to R-508. These are: reduced compressor discharge temperature; reduced GWP and equivalent or enhanced refrigeration capacity at constant compressor displacement.

Ternary Mixtures of R-744, R-1132a and R-170

The performance of selected ternary R-1132a/R-170/CO$_2$ compositions was modelled in accordance with the cycle conditions and thermodynamic model as explained in the previous examples.

The modelled data is set out in the following tables.

Ternary Mixtures of R-116, R-1132a and R-170

The performance of selected ternary R-1132a/R-170/R-116 compositions was modelled in accordance with the cycle conditions and thermodynamic model as explained in the previous examples.

The modelled data is set out in the following tables.

Quaternary Mixtures of R-116, R-744, R-1132a and R-170

The performance of selected ternary R-1132a/R-170/R-116/R-744 compositions was modelled in accordance with the cycle conditions and thermodynamic model as explained in the previous examples.

The modelled data is set out in the following tables. The composition typically have capacity close to that of R508 whilst simultaneously avoiding having too flammable a vapour phase (e.g. less flammable than corresponding ethane/R-1132a/R-116 blends) or too high a CO$_2$ content compared to corresponding CO$_2$/R-1132a/R-116 blends (which comparatively high CO$_2$ content can lead to high compressor temperatures and potential dry ice issues).

TABLE 5

Refrigeration performance modelling data for R-1132a/R-116/CO$_2$ ternary system with 4% by weight CO$_2$

| | | R744 (weight %) | | | | | | |
|---|---|---|---|---|---|---|---|---|
| | | 4% | 4% | 4% | 4% | 4% | 4% | 4% |
| | | R1132a (weight %) | | | | | | |
| | | 4.0% | 8.0% | 12.0% | 16.0% | 20.0% | 24.0% | 28.0% |
| | | R116 (weight %) | | | | | | |
| | | 92.00% | 88.00% | 84.00% | 80.00% | 76.00% | 72.00% | 68.00% |
| GWP | | 11224 | 10736 | 10249 | 9761 | 9273 | 8785 | 8297 |
| Evaporator pressure | bar | 0.90 | 0.94 | 0.98 | 1.01 | 1.04 | 1.06 | 1.08 |
| Condenser pressure | bar | 6.98 | 7.20 | 7.39 | 7.54 | 7.67 | 7.77 | 7.84 |
| Pressure ratio | | 7.74 | 7.63 | 7.54 | 7.45 | 7.38 | 7.32 | 7.26 |
| Volumetric efficiency | | 84.6% | 85.0% | 85.3% | 85.6% | 85.9% | 86.1% | 86.3% |
| Discharge temperature | ° C. | −5.9 | −5.0 | −4.1 | −3.4 | −2.6 | −2.0 | −1.3 |
| Evaporator temp glide | K | 3.6 | 3.4 | 3.0 | 2.6 | 2.2 | 1.7 | 1.3 |
| Condenser temp glide | K | 5.7 | 5.0 | 4.3 | 3.6 | 3.0 | 2.4 | 1.9 |
| Volumetric capacity | kJ/m3 | 703 | 722 | 738 | 752 | 764 | 775 | 784 |
| Cooling COP | | 2.29 | 2.26 | 2.23 | 2.21 | 2.20 | 2.18 | 2.18 |

| | | R744 (weight %) | | | | |
|---|---|---|---|---|---|---|
| | | 4% | 4% | 4% | 4% | 4% |
| | | R1132a (weight %) | | | | |
| | | 32.0% | 36.0% | 40.0% | 44.0% | 48.0% |
| | | R116 (weight %) | | | | |
| | | 64.00% | 60.00% | 56.00% | 52.00% | 48.00% |
| GWP | | 7809 | 7321 | 6834 | 6346 | 5858 |
| Evaporator pressure | bar | 1.09 | 1.10 | 1.11 | 1.11 | 1.10 |
| Condenser pressure | bar | 7.89 | 7.91 | 7.91 | 7.90 | 7.87 |
| Pressure ratio | | 7.21 | 7.17 | 7.15 | 7.13 | 7.12 |
| Volumetric efficiency | | 86.5% | 86.7% | 86.8% | 87.0% | 87.1% |
| Discharge temperature | ° C. | −0.6 | 0.2 | 1.0 | 1.8 | 2.8 |
| Evaporator temp glide | K | 1.0 | 0.7 | 0.5 | 0.4 | 0.4 |
| Condenser temp glide | K | 1.5 | 1.3 | 1.1 | 1.0 | 0.9 |

TABLE 5-continued

Refrigeration performance modelling data for R-1132a/R-116/CO$_2$ ternary system with 4% by weight CO$_2$

| | | | | | | |
|---|---|---|---|---|---|---|
| Volumetric capacity | kJ/m3 | 792 | 798 | 802 | 804 | 805 |
| Cooling COP | | 2.17 | 2.17 | 2.17 | 2.18 | 2.18 |

| | | R744 (weight %) | | | | | | |
|---|---|---|---|---|---|---|---|---|
| | | 4% | 4% | 4% | 4% | 4% | 4% | 4% |
| | | R1132a (weight %) | | | | | | |
| | | 52.0% | 56.0% | 60.0% | 64.0% | 68.0% | 70.0% | 76.0% |
| | | R116 (weight %) | | | | | | |
| | | 44.00% | 40.00% | 36.00% | 32.00% | 28.00% | 26.00% | 20.00% |
| GWP | | 5370 | 4882 | 4394 | 3907 | 3419 | 3175 | 2443 |
| Evaporator pressure | bar | 1.10 | 1.09 | 1.08 | 1.07 | 1.06 | 1.05 | 1.03 |
| Condenser pressure | bar | 7.82 | 7.77 | 7.71 | 7.65 | 7.58 | 7.54 | 7.43 |
| Pressure ratio | | 7.12 | 7.13 | 7.14 | 7.16 | 7.17 | 7.18 | 7.21 |
| Volumetric efficiency | | 87.1% | 87.2% | 87.3% | 87.3% | 87.3% | 87.4% | 87.4% |
| Discharge temperature | °C. | 3.7 | 4.7 | 5.7 | 6.6 | 7.6 | 8.0 | 9.4 |
| Evaporator temp glide | K | 0.4 | 0.4 | 0.5 | 0.5 | 0.6 | 0.6 | 0.6 |
| Condenser temp glide | K | 0.9 | 0.9 | 0.9 | 1.0 | 1.0 | 1.0 | 1.0 |
| Volumetric capacity | kJ/m3 | 804 | 802 | 799 | 795 | 791 | 789 | 782 |
| Cooling COP | | 2.18 | 2.19 | 2.19 | 2.20 | 2.21 | 2.21 | 2.22 |

| | | R744 (weight %) | | | | |
|---|---|---|---|---|---|---|
| | | 4% | 4% | 4% | 4% | 4% |
| | | R1132a (weight %) | | | | |
| | | 80.0% | 84.0% | 88.0% | 92.0% | 96% |
| | | R116 (weight %) | | | | |
| | | 16.00% | 12.00% | 8.00% | 4.00% | 0.00% |
| GWP | | 1955 | 1467 | 980 | 492 | 4 |
| Evaporator pressure | bar | 1.02 | 1.00 | 0.99 | 0.97 | 0.96 |
| Condenser pressure | bar | 7.35 | 7.27 | 7.19 | 7.11 | 7.02 |
| Pressure ratio | | 7.23 | 7.25 | 7.28 | 7.30 | 7.33 |
| Volumetric efficiency | | 87.4% | 87.4% | 87.5% | 87.5% | 87.5% |
| Discharge temperature | °C. | 10.2 | 11.1 | 11.9 | 12.7 | 13.4 |
| Evaporator temp glide | K | 0.6 | 0.5 | 0.4 | 0.3 | 0.2 |
| Condenser temp glide | K | 1.0 | 0.9 | 0.8 | 0.7 | 0.6 |
| Volumetric capacity | kJ/m3 | 777 | 772 | 766 | 760 | 753 |
| Cooling COP | | 2.23 | 2.23 | 2.24 | 2.25 | 2.25 |

TABLE 6

Refrigeration performance modelling data for R-1132a/R-116/CO$_2$ ternary system with 8% by weight CO$_2$

| | | R744 (weight %) | | | | | | |
|---|---|---|---|---|---|---|---|---|
| | | 8.0% | 8.0% | 8.0% | 8.0% | 8.0% | 8.0% | 8.0% |
| | | R1132a (weight %) | | | | | | |
| | | 4.0% | 8.0% | 12.0% | 16.0% | 20.0% | 24.0% | 28.0% |
| | | R116 (weight %) | | | | | | |
| | | 88.0% | 84.0% | 80.0% | 76.0% | 72.0% | 68.0% | 64.0% |
| GWP | | 10736 | 10248 | 9761 | 9273 | 8785 | 8297 | 7809 |
| Evaporator pressure | bar | 1.04 | 1.07 | 1.09 | 1.11 | 1.13 | 1.15 | 1.16 |
| Condenser pressure | bar | 7.85 | 8.01 | 8.14 | 8.24 | 8.31 | 8.37 | 8.39 |
| Pressure ratio | | 7.55 | 7.50 | 7.45 | 7.40 | 7.35 | 7.30 | 7.26 |
| Volumetric efficiency | | 85.4% | 85.6% | 85.8% | 86.0% | 86.2% | 86.4% | 86.6% |
| Discharge temperature | ° C. | −1.3 | −0.6 | 0.1 | 0.7 | 1.3 | 2.0 | 2.6 |
| Evaporator temp glide | K | 5.0 | 4.3 | 3.6 | 2.9 | 2.3 | 1.8 | 1.3 |
| Condenser temp glide | K | 7.0 | 6.0 | 5.0 | 4.2 | 3.4 | 2.8 | 2.3 |
| Volumetric capacity | kJ/m3 | 805 | 812 | 819 | 827 | 833 | 840 | 845 |
| Cooling COP | | 2.29 | 2.25 | 2.23 | 2.20 | 2.19 | 2.18 | 2.17 |

| | | R744 (weight %) | | | | |
|---|---|---|---|---|---|---|
| | | 8.0% | 8.0% | 8.0% | 8.0% | 8.0% |
| | | R1132a (weight %) | | | | |
| | | 32.0% | 36.0% | 40.0% | 44.0% | 48.0% |
| | | R116 (weight %) | | | | |
| | | 60.0% | 56.0% | 52.0% | 48.0% | 44.0% |
| GWP | | 7321 | 6834 | 6346 | 5858 | 5370 |
| Evaporator pressure | bar | 1.16 | 1.16 | 1.16 | 1.15 | 1.15 |
| Condenser pressure | bar | 8.39 | 8.38 | 8.34 | 8.29 | 8.23 |
| Pressure ratio | | 7.22 | 7.20 | 7.18 | 7.18 | 7.18 |
| Volumetric efficiency | | 86.8% | 86.9% | 87.0% | 87.1% | 87.2% |
| Discharge temperature | ° C. | 3.3 | 4.0 | 4.9 | 5.7 | 6.7 |
| Evaporator temp glide | K | 1.0 | 0.8 | 0.6 | 0.6 | 0.6 |
| Condenser temp glide | K | 2.0 | 1.7 | 1.5 | 1.5 | 1.4 |
| Volumetric capacity | kJ/m3 | 848 | 850 | 849 | 848 | 845 |
| Cooling COP | | 2.17 | 2.17 | 2.17 | 2.18 | 2.18 |

| | | R744 (weight %) | | | | | |
|---|---|---|---|---|---|---|---|
| | | 8.0% | 8.0% | 8.0% | 8.0% | 8.0% | 8.0% |
| | | R1132a (weight %) | | | | | |
| | | 52.0% | 56.0% | 60.0% | 64.0% | 68.0% | 70.0% |
| | | R116 (weight %) | | | | | |
| | | 40.0% | 36.0% | 32.0% | 28.0% | 24.0% | 22.0% |
| GWP | | 4882 | 4394 | 3906 | 3419 | 2931 | 2687 |
| Evaporator pressure | bar | 1.13 | 1.12 | 1.11 | 1.09 | 1.08 | 1.07 |
| Condenser pressure | bar | 8.16 | 8.08 | 8.00 | 7.92 | 7.83 | 7.79 |
| Pressure ratio | | 7.19 | 7.20 | 7.21 | 7.23 | 7.25 | 7.26 |

TABLE 6-continued

Refrigeration performance modelling data for R-1132a/R-116/CO₂ ternary system with 8% by weight CO₂

| | | | | | | | |
|---|---|---|---|---|---|---|---|
| Volumetric efficiency | | 87.3% | 87.3% | 87.3% | 87.4% | 87.4% | 87.4% |
| Discharge temperature | ° C. | 7.6 | 8.6 | 9.5 | 10.4 | 11.3 | 11.7 |
| Evaporator temp glide | K | 0.6 | 0.7 | 0.7 | 0.8 | 0.8 | 0.8 |
| Condenser temp glide | K | 1.4 | 1.4 | 1.4 | 1.5 | 1.5 | 1.5 |
| Volumetric capacity | kJ/m3 | 841 | 836 | 831 | 826 | 820 | 817 |
| Cooling COP | | 2.18 | 2.19 | 2.20 | 2.20 | 2.21 | 2.21 |

| | | R744 (weight %) | | | | |
|---|---|---|---|---|---|---|
| | | 8.0% | 8.0% | 8.0% | 8.0% | 8.0% |
| | | R1132a (weight %) | | | | |
| | | 76.0% | 80.0% | 84.0% | 88.0% | 92.0% |
| | | R116 (weight %) | | | | |
| | | 16.0% | 12.0% | 8.0% | 4.0% | 0.0% |
| GWP | | 1955 | 1467 | 979 | 492 | 4 |
| Evaporator pressure | bar | 1.05 | 1.03 | 1.02 | 1.00 | 0.99 |
| Condenser pressure | bar | 7.65 | 7.56 | 7.47 | 7.37 | 7.28 |
| Pressure ratio | | 7.29 | 7.31 | 7.33 | 7.36 | 7.38 |
| Volumetric efficiency | | 87.5% | 87.5% | 87.5% | 87.5% | 87.5% |
| Discharge temperature | ° C. | 13.0 | 13.8 | 14.5 | 15.3 | 16.0 |
| Evaporator temp glide | K | 0.7 | 0.7 | 0.6 | 0.5 | 0.4 |
| Condenser temp glide | K | 1.4 | 1.3 | 1.3 | 1.1 | 1.0 |
| Volumetric capacity | kJ/m3 | 808 | 801 | 794 | 787 | 779 |
| Cooling COP | | 2.22 | 2.23 | 2.24 | 2.24 | 2.25 |

TABLE 7

Refrigeration performance modelling data for R-1132a/R-116/C₂ ternary system with 12% by weight CO₂

| | | R744 (weight %) | | | | | |
|---|---|---|---|---|---|---|---|
| | | 12.0% | 12.0% | 12.0% | 12.0% | 12.0% | 12.0% |
| | | R1132a (weight %) | | | | | |
| | | 4.0% | 8.0% | 12.0% | 16.0% | 20.0% | 24.0% |
| | | R116 (weight %) | | | | | |
| | | 84.0% | 80.0% | 76.0% | 72.0% | 68.0% | 64.0% |
| GWP | | 10248 | 9760 | 9273 | 8785 | 8297 | 7809 |
| Evaporator pressure | bar | 1.15 | 1.17 | 1.18 | 1.20 | 1.21 | 1.22 |
| Condenser pressure | bar | 8.55 | 8.66 | 8.75 | 8.81 | 8.85 | 8.86 |
| Pressure ratio | | 7.45 | 7.43 | 7.39 | 7.35 | 7.32 | 7.28 |
| Volumetric efficiency | | 85.9% | 86.1% | 86.3% | 86.4% | 86.6% | 86.8% |
| Discharge temperature | ° C. | 2.7 | 3.3 | 3.9 | 4.5 | 5.0 | 5.6 |
| Evaporator temp glide | K | 5.0 | 4.1 | 3.4 | 2.7 | 2.1 | 1.6 |
| Condenser temp glide | K | 6.8 | 5.7 | 4.8 | 3.9 | 3.3 | 2.7 |

TABLE 7-continued

Refrigeration performance modelling data for R-1132a/R-116/C$_2$ ternary system with 12% by weight CO$_2$

| | | | | | | |
|---|---|---|---|---|---|---|
| Volumetric capacity | kJ/m3 | 879 | 881 | 885 | 888 | 892 | 894 |
| Cooling COP | | 2.27 | 2.23 | 2.21 | 2.19 | 2.18 | 2.17 |

| | R744 (weight %) | | | | |
|---|---|---|---|---|---|
| | 12.0% | 12.0% | 12.0% | 12.0% | 12.0% |
| | R1132a (weight %) | | | | |
| | 28.0% | 32.0% | 36.0% | 40.0% | 44.0% |
| | R116 (weight %) | | | | |
| | 60.0% | 56.0% | 52.0% | 48.0% | 44.0% |

| | | | | | | |
|---|---|---|---|---|---|---|
| GWP | | 7321 | 6833 | 6346 | 5858 | 5370 |
| Evaporator pressure | bar | 1.22 | 1.22 | 1.21 | 1.20 | 1.19 |
| Condenser pressure | bar | 8.84 | 8.81 | 8.75 | 8.69 | 8.61 |
| Pressure ratio | | 7.25 | 7.23 | 7.22 | 7.22 | 7.23 |
| Volumetric efficiency | | 86.9% | 87.0% | 87.1% | 87.2% | 87.3% |
| Discharge temperature | °C. | 6.3 | 7.0 | 7.8 | 8.7 | 9.6 |
| Evaporator temp glide | K | 1.2 | 0.9 | 0.8 | 0.7 | 0.7 |
| Condenser temp glide | K | 2.3 | 2.0 | 1.8 | 1.7 | 1.7 |
| Volumetric capacity | kJ/m3 | 895 | 895 | 893 | 889 | 884 |
| Cooling COP | | 2.17 | 2.17 | 2.17 | 2.17 | 2.18 |

| | R744 (weight %) | | | | | |
|---|---|---|---|---|---|---|
| | 12.0% | 12.0% | 12.0% | 12.0% | 12.0% | 12.0% |
| | R1132a (weight %) | | | | | |
| | 48.0% | 52.0% | 56.0% | 60.0% | 64.0% | 68.0% |
| | R116 (weight %) | | | | | |
| | 40.0% | 36.0% | 32.0% | 28.0% | 24.0% | 20.0% |

| | | | | | | | |
|---|---|---|---|---|---|---|---|
| GWP | | 4882 | 4394 | 3906 | 3419 | 2931 | 2443 |
| Evaporator pressure | bar | 1.18 | 1.16 | 1.15 | 1.13 | 1.12 | 1.10 |
| Condenser pressure | bar | 8.52 | 8.43 | 8.34 | 8.24 | 8.14 | 8.04 |
| Pressure ratio | | 7.24 | 7.25 | 7.26 | 7.28 | 7.30 | 7.32 |
| Volumetric efficiency | | 87.3% | 87.4% | 87.4% | 87.5% | 87.5% | 87.5% |
| Discharge temperature | °C. | 10.5 | 11.4 | 12.3 | 13.2 | 14.0 | 14.9 |
| Evaporator temp glide | K | 0.7 | 0.8 | 0.8 | 0.9 | 0.9 | 0.9 |
| Condenser temp glide | K | 1.7 | 1.7 | 1.7 | 1.7 | 1.7 | 1.7 |
| Volumetric capacity | kJ/m3 | 878 | 872 | 866 | 859 | 852 | 844 |
| Cooling COP | | 2.18 | 2.19 | 2.19 | 2.20 | 2.20 | 2.21 |

TABLE 7-continued

Refrigeration performance modelling data for R-1132a/R-116/C$_2$ ternary system with 12% by weight CO$_2$

| | | R744 (weight %) | | | | |
|---|---|---|---|---|---|---|
| | | 12.0% | 12.0% | 12.0% | 12.0% | 12.0% |
| | | R1132a (weight %) | | | | |
| | | 70.0% | 76.0% | 80.0% | 84.0% | 88.0% |
| | | R116 (weight %) | | | | |
| | | 18.0% | 12.0% | 8.0% | 4.0% | 0.0% |
| GWP | | 2199 | 1467 | 979 | 491 | 4 |
| Evaporator pressure | bar | 1.09 | 1.06 | 1.05 | 1.03 | 1.01 |
| Condenser pressure | bar | 7.98 | 7.83 | 7.73 | 7.63 | 7.52 |
| Pressure ratio | | 7.33 | 7.36 | 7.38 | 7.40 | 7.43 |
| Volumetric efficiency | | 87.5% | 87.5% | 87.6% | 87.6% | 87.6% |
| Discharge temperature | ° C. | 15.3 | 16.4 | 17.2 | 17.9 | 18.6 |
| Evaporator temp glide | K | 0.9 | 0.8 | 0.7 | 0.6 | 0.5 |
| Condenser temp glide | K | 1.7 | 1.6 | 1.5 | 1.4 | 1.3 |
| Volumetric capacity | kJ/m3 | 841 | 829 | 821 | 813 | 805 |
| Cooling COP | | 2.22 | 2.23 | 2.23 | 2.24 | 2.25 |

TABLE 8

Refrigeration performance modelling data for R-1132a/R-116/CO$_2$ ternary system with 16% by weight CO$_2$

| | | R744 (weight %) | | | | | |
|---|---|---|---|---|---|---|---|
| | | 16.0% | 16.0% | 16.0% | 16.0% | 16.0% | 16.0% |
| | | R1132a (weight %) | | | | | |
| | | 4.0% | 8.0% | 12.0% | 16.0% | 20.0% | 24.0% |
| | | R116 (weight %) | | | | | |
| | | 80.0% | 76.0% | 72.0% | 68.0% | 64.0% | 60.0% |
| GWP | | 9760 | 9272 | 8785 | 8297 | 7809 | 7321 |
| Evaporator pressure | bar | 1.23 | 1.25 | 1.26 | 1.27 | 1.27 | 1.27 |
| Condenser pressure | bar | 9.13 | 9.21 | 9.26 | 9.29 | 9.29 | 9.26 |
| Pressure ratio | | 7.40 | 7.38 | 7.36 | 7.33 | 7.30 | 7.27 |
| Volumetric efficiency | | 86.4% | 86.5% | 86.7% | 86.8% | 86.9% | 87.1% |
| Discharge temperature | ° C. | 6.4 | 7.0 | 7.5 | 8.0 | 8.6 | 9.2 |
| Evaporator temp glide | K | 4.4 | 3.5 | 2.8 | 2.1 | 1.6 | 1.2 |
| Condenser temp glide | K | 6.0 | 5.0 | 4.1 | 3.4 | 2.8 | 2.4 |
| Volumetric capacity | kJ/m3 | 937 | 937 | 939 | 940 | 941 | 940 |
| Cooling COP | | 2.24 | 2.21 | 2.19 | 2.18 | 2.17 | 2.17 |

| | R744 (weight %) | | | | |
|---|---|---|---|---|---|
| | 16.0% | 16.0% | 16.0% | 16.0% | 16.0% |
| | R1132a (weight %) | | | | |
| | 28.0% | 32.0% | 36.0% | 40.0% | 44.0% |
| | R116 (weight %) | | | | |
| | 56.0% | 52.0% | 48.0% | 44.0% | 40.0% |

TABLE 8-continued

Refrigeration performance modelling data for R-1132a/R-116/CO₂ ternary system with 16% by weight CO₂

| | | | | | | |
|---|---|---|---|---|---|---|
| GWP | | 6833 | 6345 | 5858 | 5370 | 4882 |
| Evaporator pressure | bar | 1.27 | 1.26 | 1.25 | 1.23 | 1.22 |
| Condenser pressure | bar | 9.21 | 9.14 | 9.06 | 8.97 | 8.87 |
| Pressure ratio | | 7.26 | 7.25 | 7.26 | 7.26 | 7.28 |
| Volumetric efficiency | | 87.2% | 87.3% | 87.3% | 87.4% | 87.4% |
| Discharge temperature | °C. | 9.9 | 10.7 | 11.6 | 12.4 | 13.3 |
| Evaporator temp glide | K | 1.0 | 0.8 | 0.8 | 0.8 | 0.8 |
| Condenser temp glide | K | 2.1 | 1.9 | 1.8 | 1.8 | 1.8 |
| Volumetric capacity | kJ/m3 | 938 | 934 | 928 | 921 | 914 |
| Cooling COP | | 2.17 | 2.17 | 2.17 | 2.17 | 2.18 |

| | R744 (weight %) | | | | | | | | | |
|---|---|---|---|---|---|---|---|---|---|---|
| | 16.0% | 16.0% | 16.0% | 16.0% | 16.0% | 16.0% | 16.0% | 16.0% | 16.0% | 16.0% |
| | R1132a (weight %) | | | | | | | | | |
| | 48.0% | 52.0% | 56.0% | 60.0% | 64.0% | 68.0% | 70.0% | 76.0% | 80.0% | 84.0% |
| | R116 (weight %) | | | | | | | | | |
| | 36.0% | 32.0% | 28.0% | 24.0% | 20.0% | 16.0% | 14.0% | 8.0% | 4.0% | 0.0% |

| | | | | | | | | | | |
|---|---|---|---|---|---|---|---|---|---|---|
| GWP | | 4394 | 3906 | 3418 | 2931 | 2443 | 1955 | 1711 | 979 | 491 | 4 |
| Evaporator pressure | bar | 1.20 | 1.18 | 1.17 | 1.15 | 1.13 | 1.11 | 1.10 | 1.08 | 1.06 | 1.04 |
| Condenser pressure | bar | 8.76 | 8.65 | 8.54 | 8.43 | 8.32 | 8.20 | 8.15 | 7.98 | 7.87 | 7.76 |
| Pressure ratio | | 7.29 | 7.30 | 7.32 | 7.34 | 7.36 | 7.38 | 7.39 | 7.42 | 7.44 | 7.47 |
| Volumetric efficiency | | 87.5% | 87.5% | 87.5% | 87.6% | 87.6% | 87.6% | 87.6% | 87.6% | 87.6% | 87.6% |
| Discharge temperature | °C. | 14.2 | 15.1 | 16.0 | 16.8 | 17.6 | 18.4 | 18.8 | 19.8 | 20.5 | 21.2 |
| Evaporator temp glide | K | 0.8 | 0.9 | 0.9 | 1.0 | 1.0 | 0.9 | 0.9 | 0.8 | 0.7 | 0.5 |
| Condenser temp glide | K | 1.8 | 1.8 | 1.9 | 1.9 | 1.9 | 1.8 | 1.8 | 1.7 | 1.6 | 1.5 |
| Volumetric capacity | kJ/m3 | 906 | 898 | 890 | 882 | 874 | 865 | 861 | 848 | 839 | 830 |
| Cooling COP | | 2.18 | 2.19 | 2.19 | 2.20 | 2.21 | 2.21 | 2.22 | 2.23 | 2.24 | 2.24 |

TABLE 9

Refrigeration performance modelling data for R-1132a/R-116/CO2 ternary system with 20% by weight CO2

| | R744 (weight %) | | | | | | | | | |
|---|---|---|---|---|---|---|---|---|---|---|
| | 20.0% | 20.0% | 20.0% | 20.0% | 20.0% | 20.0% | 20.0% | 20.0% | 20.0% | 20.0% |
| | R1132a (weight %) | | | | | | | | | |
| | 4.0% | 8.0% | 12.0% | 16.0% | 20.0% | 24.0% | 28.0% | 32.0% | 36.0% | 40.0% |
| | R116 (weight %) | | | | | | | | | |
| | 76.0% | 72.0% | 68.0% | 64.0% | 60.0% | 56.0% | 52.0% | 48.0% | 44.0% | 40.0% |

| | | | | | | | | | | |
|---|---|---|---|---|---|---|---|---|---|---|
| GWP | | 9272 | 8785 | 8297 | 7809 | 7321 | 6833 | 6345 | 5857 | 5370 | 4882 |
| Evaporator pressure | bar | 1.31 | 1.32 | 1.32 | 1.33 | 1.32 | 1.32 | 1.31 | 1.29 | 1.27 | 1.26 |
| Condenser pressure | bar | 9.63 | 9.68 | 9.70 | 9.69 | 9.65 | 9.59 | 9.51 | 9.41 | 9.30 | 9.19 |
| Pressure ratio | | 7.38 | 7.36 | 7.33 | 7.31 | 7.29 | 7.28 | 7.28 | 7.29 | 7.30 | 7.31 |
| Volumetric efficiency | | 86.8% | 86.9% | 87.0% | 87.1% | 87.2% | 87.3% | 87.4% | 87.5% | 87.5% | 87.6% |
| Discharge temperature | °C. | 9.9 | 10.5 | 11.0 | 11.5 | 12.1 | 12.8 | 13.6 | 14.5 | 15.4 | 16.2 |

TABLE 9-continued

Refrigeration performance modelling data for R-1132a/R-116/CO2 ternary system with 20% by weight CO2

| | | | | | | | | | | | |
|---|---|---|---|---|---|---|---|---|---|---|---|
| Evaporator temp glide | K | 3.4 | 2.7 | 2.0 | 1.5 | 1.1 | 0.9 | 0.8 | 0.7 | 0.7 | 0.8 |
| Condenser temp glide | K | 4.9 | 4.0 | 3.3 | 2.7 | 2.3 | 2.0 | 1.9 | 1.8 | 1.7 | 1.8 |
| Volumetric capacity | kJ/m3 | 985 | 986 | 986 | 985 | 983 | 978 | 972 | 965 | 957 | 948 |
| Cooling COP | | 2.21 | 2.19 | 2.18 | 2.17 | 2.17 | 2.17 | 2.17 | 2.17 | 2.17 | 2.17 |

| | | R744 (weight %) | | | | | | | | | |
|---|---|---|---|---|---|---|---|---|---|---|---|
| | | 20.0% | 20.0% | 20.0% | 20.0% | 20.0% | 20.0% | 20.0% | 20.0% | 20.0% | 20.0% |
| | | R1132a (weight %) | | | | | | | | | |
| | | 44.0% | 48.0% | 52.0% | 56.0% | 60.0% | 64.0% | 68.0% | 70.0% | 76.0% | 80.0% |
| | | R116 (weight %) | | | | | | | | | |
| | | 36.0% | 32.0% | 28.0% | 24.0% | 20.0% | 16.0% | 12.0% | 10.0% | 4.0% | 0.0% |
| GWP | | 4394 | 3906 | 3418 | 2930 | 2443 | 1955 | 1467 | 1223 | 491 | 3 |
| Evaporator pressure | bar | 1.24 | 1.22 | 1.20 | 1.18 | 1.16 | 1.14 | 1.12 | 1.11 | 1.08 | 1.06 |
| Condenser pressure | bar | 9.07 | 8.95 | 8.83 | 8.70 | 8.58 | 8.46 | 8.34 | 8.28 | 8.10 | 7.98 |
| Pressure ratio | | 7.33 | 7.34 | 7.36 | 7.38 | 7.40 | 7.42 | 7.44 | 7.45 | 7.48 | 7.50 |
| Volumetric efficiency | | 87.6% | 87.6% | 87.6% | 87.7% | 87.7% | 87.7% | 87.7% | 87.7% | 87.7% | 87.7% |
| Discharge temperature | ° C. | 17.1 | 18.0 | 18.8 | 19.6 | 20.4 | 21.1 | 21.8 | 22.2 | 23.2 | 23.8 |
| Evaporator temp glide | K | 0.8 | 0.9 | 0.9 | 1.0 | 1.0 | 1.0 | 0.9 | 0.9 | 0.7 | 0.6 |
| Condenser temp glide | K | 1.8 | 1.8 | 1.9 | 1.9 | 1.9 | 1.9 | 1.9 | 1.8 | 1.7 | 1.6 |
| Volumetric capacity | kJ/m3 | 939 | 930 | 920 | 911 | 902 | 892 | 883 | 878 | 863 | 853 |
| Cooling COP | | 2.18 | 2.18 | 2.19 | 2.20 | 2.20 | 2.21 | 2.22 | 2.22 | 2.23 | 2.24 |

TABLE 10

Refrigeration performance modelling data for R-1132a/R-116/CO$_2$ ternary system with 24% by weight CO$_2$

| | | R744 (weight %) | | | | | |
|---|---|---|---|---|---|---|---|
| | | 24.0% | 24.0% | 24.0% | 24.0% | 24.0% | 24.0% |
| | | R1132a (weight %) | | | | | |
| | | 4.0% | 8.0% | 12.0% | 16.0% | 20.0% | 24.0% |
| | | R116 (weight %) | | | | | |
| | | 72.0% | 68.0% | 64.0% | 60.0% | 56.0% | 52.0% |
| GWP | | 8784 | 8297 | 7809 | 7321 | 6833 | 6345 |
| Evaporator pressure | bar | 1.37 | 1.37 | 1.37 | 1.37 | 1.36 | 1.35 |
| Condenser pressure | bar | 10.06 | 10.08 | 10.06 | 10.01 | 9.94 | 9.85 |
| Pressure ratio | | 7.35 | 7.34 | 7.32 | 7.31 | 7.31 | 7.31 |
| Volumetric efficiency | | 87.1% | 87.2% | 87.3% | 87.4% | 87.5% | 87.6% |
| Discharge temperature | ° C. | 13.4 | 13.9 | 14.4 | 15.1 | 15.8 | 16.6 |
| Evaporator temp glide | K | 2.4 | 1.8 | 1.3 | 1.0 | 0.8 | 0.7 |
| Condenser temp glide | K | 3.8 | 3.0 | 2.5 | 2.1 | 1.8 | 1.7 |
| Volumetric capacity | kJ/m3 | 1029 | 1029 | 1026 | 1023 | 1017 | 1009 |
| Cooling COP | | 2.19 | 2.18 | 2.17 | 2.17 | 2.16 | 2.16 |

TABLE 10-continued

Refrigeration performance modelling data for R-1132a/R-116/CO$_2$ ternary system with 24% by weight CO$_2$

| | | R744 (weight %) | | | |
|---|---|---|---|---|---|
| | | 24.0% | 24.0% | 24.0% | 24.0% |
| | | R1132a (weight %) | | | |
| | | 28.0% | 32.0% | 36.0% | 40.0% |
| | | R116 (weight %) | | | |
| | | 48.0% | 44.0% | 40.0% | 36.0% |
| GWP | | 5857 | 5370 | 4882 | 4394 |
| Evaporator pressure | bar | 1.33 | 1.31 | 1.29 | 1.27 |
| Condenser pressure | bar | 9.74 | 9.62 | 9.50 | 9.37 |
| Pressure ratio | | 7.32 | 7.33 | 7.35 | 7.36 |
| Volumetric efficiency | | 87.6% | 87.6% | 87.7% | 87.7% |
| Discharge temperature | °C. | 17.4 | 18.3 | 19.2 | 20.0 |
| Evaporator temp glide | K | 0.6 | 0.7 | 0.7 | 0.8 |
| Condenser temp glide | K | 1.6 | 1.6 | 1.6 | 1.7 |
| Volumetric capacity | kJ/m3 | 1000 | 990 | 980 | 970 |
| Cooling COP | | 2.16 | 2.17 | 2.17 | 2.18 |

| | | R744 (weight %) | | | | | | | | |
|---|---|---|---|---|---|---|---|---|---|---|
| | | 24.0% | 24.0% | 24.0% | 24.0% | 24.0% | 24.0% | 24.0% | 24.0% | 24.0% |
| | | R1132a (weight %) | | | | | | | | |
| | | 44.0% | 48.0% | 52.0% | 56.0% | 60.0% | 64.0% | 68.0% | 70.0% | 76.0% |
| | | R116 (weight %) | | | | | | | | |
| | | 32.0% | 28.0% | 24.0% | 20.0% | 16.0% | 12.0% | 8.0% | 6.0% | 0.0% |
| GWP | | 3906 | 3418 | 2930 | 2442 | 1955 | 1467 | 979 | 735 | 3 |
| Evaporator pressure | bar | 1.25 | 1.23 | 1.21 | 1.19 | 1.17 | 1.15 | 1.13 | 1.12 | 1.09 |
| Condenser pressure | bar | 9.23 | 9.10 | 8.97 | 8.83 | 8.70 | 8.57 | 8.44 | 8.38 | 8.19 |
| Pressure ratio | | 7.38 | 7.40 | 7.41 | 7.43 | 7.45 | 7.47 | 7.49 | 7.50 | 7.54 |
| Volumetric efficiency | | 87.7% | 87.8% | 87.8% | 87.8% | 87.8% | 87.8% | 87.8% | 87.8% | 87.8% |
| Discharge temperature | °C. | 20.8 | 21.6 | 22.4 | 23.2 | 23.9 | 24.5 | 25.2 | 25.5 | 26.4 |
| Evaporator temp glide | K | 0.9 | 0.9 | 1.0 | 1.0 | 1.0 | 0.9 | 0.8 | 0.8 | 0.6 |
| Condenser temp glide | K | 1.8 | 1.8 | 1.9 | 1.9 | 1.9 | 1.9 | 1.8 | 1.8 | 1.6 |
| Volumetric capacity | kJ/m3 | 960 | 949 | 939 | 929 | 918 | 908 | 897 | 892 | 876 |
| Cooling COP | | 2.18 | 2.19 | 2.19 | 2.20 | 2.21 | 2.22 | 2.22 | 2.23 | 2.24 |

TABLE 11

Refrigeration performance modelling data for R-1132a/R-116/CO$_2$ ternary system with 30% by weight CO$_2$

| | | R744 (weight %) | | | | | | | | |
|---|---|---|---|---|---|---|---|---|---|---|
| | | 30.0% | 30.0% | 30.0% | 30.0% | 30.0% | 30.0% | 30.0% | 30.0% | 30.0% |
| | | R1132a (weight %) | | | | | | | | |
| | | 4.0% | 8.0% | 12.0% | 16.0% | 20.0% | 24.0% | 28.0% | 32.0% | 36.0% |
| | | R116 (weight %) | | | | | | | | |
| | | 66.0% | 62.0% | 58.0% | 54.0% | 50.0% | 46.0% | 42.0% | 38.0% | 34.0% |
| GWP | | 8052 | 7565 | 7077 | 6589 | 6101 | 5613 | 5125 | 4638 | 4150 |
| Evaporator pressure | bar | 1.44 | 1.44 | 1.43 | 1.41 | 1.39 | 1.37 | 1.35 | 1.33 | 1.31 |
| Condenser pressure | bar | 10.58 | 10.54 | 10.47 | 10.38 | 10.26 | 10.13 | 9.99 | 9.85 | 9.70 |
| Pressure ratio | | 7.33 | 7.33 | 7.34 | 7.35 | 7.36 | 7.38 | 7.39 | 7.41 | 7.43 |
| Volumetric efficiency | | 87.6% | 87.7% | 87.7% | 87.8% | 87.8% | 87.8% | 87.9% | 87.9% | 87.9% |
| Discharge temperature | °C. | 18.5 | 19.2 | 19.9 | 20.8 | 21.6 | 22.5 | 23.3 | 24.1 | 24.9 |
| Evaporator temp glide | K | 0.9 | 0.7 | 0.5 | 0.4 | 0.4 | 0.5 | 0.6 | 0.7 | 0.7 |
| Condenser temp glide | K | 2.2 | 1.7 | 1.4 | 1.3 | 1.2 | 1.2 | 1.3 | 1.4 | 1.5 |
| Volumetric capacity | kJ/m3 | 1087 | 1082 | 1074 | 1065 | 1054 | 1042 | 1031 | 1019 | 1007 |
| Cooling COP | | 2.17 | 2.16 | 2.16 | 2.16 | 2.16 | 2.16 | 2.16 | 2.17 | 2.17 |

| | | R744 (weight %) | | | | | | | | |
|---|---|---|---|---|---|---|---|---|---|---|
| | | 30.0% | 30.0% | 30.0% | 30.0% | 30.0% | 30.0% | 30.0% | 30.0% | 30.0% |
| | | R1132a (weight %) | | | | | | | | |
| | | 40.0% | 44.0% | 48.0% | 52.0% | 56.0% | 60.0% | 64.0% | 68.0% | 70.0% |
| | | R116 (weight %) | | | | | | | | |
| | | 30.0% | 26.0% | 22.0% | 18.0% | 14.0% | 10.0% | 6.0% | 2.0% | 0.0% |
| GWP | | 3662 | 3174 | 2686 | 2198 | 1711 | 1223 | 735 | 247 | 3 |
| Evaporator pressure | bar | 1.28 | 1.26 | 1.24 | 1.22 | 1.19 | 1.17 | 1.15 | 1.13 | 1.12 |
| Condenser pressure | bar | 9.55 | 9.40 | 9.26 | 9.11 | 8.97 | 8.83 | 8.69 | 8.55 | 8.48 |
| Pressure ratio | | 7.44 | 7.46 | 7.48 | 7.50 | 7.51 | 7.53 | 7.56 | 7.58 | 7.59 |
| Volumetric efficiency | | 87.9% | 87.9% | 87.9% | 88.0% | 88.0% | 88.0% | 88.0% | 88.0% | 88.0% |
| Discharge temperature | °C. | 25.7 | 26.4 | 27.1 | 27.8 | 28.4 | 29.0 | 29.6 | 30.2 | 30.5 |
| Evaporator temp glide | K | 0.8 | 0.9 | 0.9 | 0.9 | 0.9 | 0.8 | 0.7 | 0.6 | 0.6 |
| Condenser temp glide | K | 1.6 | 1.7 | 1.7 | 1.8 | 1.8 | 1.7 | 1.7 | 1.6 | 1.5 |
| Volumetric capacity | kJ/m3 | 995 | 984 | 972 | 961 | 949 | 938 | 926 | 915 | 909 |
| Cooling COP | | 2.18 | 2.18 | 2.19 | 2.20 | 2.21 | 2.21 | 2.22 | 2.23 | 2.23 |

TABLE 12

Refrigeration performance modelling data for R-1132a/R-170/CO₂ ternary system with 4% by weight CO₂

| | | R744 (weight %) | | | | | | |
|---|---|---|---|---|---|---|---|---|
| | | 4% | 4% | 4% | 4% | 4% | 4% | 4% |
| | | R170 (weight %) | | | | | | |
| | | 4.0% | 8.0% | 12.0% | 16.0% | 20.0% | 24.0% | 28.0% |
| | | R1132a (weight %) | | | | | | |
| | | 92.00% | 88.00% | 84.00% | 80.00% | 76.00% | 72.00% | 68.00% |
| GWP | | 4 | 4 | 4 | 4 | 4 | 4 | 4 |
| Evaporator pressure | bar | 1.02 | 1.08 | 1.13 | 1.18 | 1.22 | 1.25 | 1.28 |
| Condenser pressure | bar | 7.38 | 7.68 | 7.92 | 8.13 | 8.30 | 8.43 | 8.54 |
| Pressure ratio | | 7.21 | 7.09 | 6.99 | 6.90 | 6.83 | 6.75 | 6.69 |
| Volumetric efficiency | | 87.8% | 88.1% | 88.4% | 88.6% | 88.9% | 89.1% | 89.3% |
| Discharge temperature | ° C. | 15.1 | 16.7 | 18.0 | 19.3 | 20.5 | 21.6 | 22.7 |
| Evaporator temp glide | K | 0.8 | 1.2 | 1.3 | 1.3 | 1.2 | 1.1 | 0.9 |
| Condenser temp glide | K | 1.2 | 1.4 | 1.5 | 1.4 | 1.2 | 1.1 | 0.9 |
| Volumetric capacity | kJ/m3 | 806 | 852 | 892 | 926 | 955 | 980 | 1002 |
| Cooling COP | | 2.27 | 2.29 | 2.30 | 2.31 | 2.32 | 2.33 | 2.33 |

| | | R744 (weight %) | | | | |
|---|---|---|---|---|---|---|
| | | 4% | 4% | 4% | 4% | 4% |
| | | R170 (weight %) | | | | |
| | | 32.0% | 36.0% | 40.0% | 44.0% | 48.0% |
| | | R1132a (weight %) | | | | |
| | | 64.00% | 60.00% | 56.00% | 52.00% | 48.00% |
| GWP | | 4 | 4 | 3 | 3 | 3 |
| Evaporator pressure | bar | 1.30 | 1.32 | 1.33 | 1.34 | 1.35 |
| Condenser pressure | bar | 8.62 | 8.67 | 8.71 | 8.72 | 8.72 |
| Pressure ratio | | 6.63 | 6.58 | 6.54 | 6.50 | 6.47 |
| Volumetric efficiency | | 89.4% | 89.6% | 89.8% | 89.9% | 90.0% |
| Discharge temperature | ° C. | 23.7 | 24.8 | 25.8 | 26.9 | 28.0 |
| Evaporator temp glide | K | 0.8 | 0.6 | 0.5 | 0.5 | 0.4 |
| Condenser temp glide | K | 0.8 | 0.8 | 0.7 | 0.8 | 0.8 |
| Volumetric capacity | kJ/m3 | 1019 | 1033 | 1044 | 1052 | 1057 |
| Cooling COP | | 2.34 | 2.34 | 2.34 | 2.34 | 2.35 |

| | | R744 (weight %) | | | | | | |
|---|---|---|---|---|---|---|---|---|
| | | 4% | 4% | 4% | 4% | 4% | 4% | 4% |
| | | R170 (weight %) | | | | | | |
| | | 52.0% | 56.0% | 60.0% | 64.0% | 68.0% | 70.0% | 76.0% |
| | | R1132a (weight %) | | | | | | |
| | | 44.00% | 40.00% | 36.00% | 32.00% | 28.00% | 26.00% | 20.00% |
| GWP | | 3 | 3 | 3 | 3 | 3 | 3 | 3 |
| Evaporator pressure | bar | 1.35 | 1.35 | 1.35 | 1.35 | 1.34 | 1.34 | 1.33 |
| Condenser pressure | bar | 8.71 | 8.69 | 8.66 | 8.62 | 8.57 | 8.52 | 8.47 |
| Pressure ratio | | 6.45 | 6.42 | 6.41 | 6.39 | 6.38 | 6.37 | 6.36 |

TABLE 12-continued

Refrigeration performance modelling data for R-1132a/R-170/CO₂ ternary system with 4% by weight CO₂

| | | | | | | | |
|---|---|---|---|---|---|---|---|
| Volumetric efficiency | | 90.2% | 90.3% | 90.3% | 90.4% | 90.5% | 90.6% | 90.7% |
| Discharge temperature | °C. | 29.1 | 30.2 | 31.3 | 32.4 | 33.5 | 34.6 | 35.7 |
| Evaporator temp glide | K | 0.4 | 0.5 | 0.5 | 0.6 | 0.6 | 0.7 | 0.8 |
| Condenser temp glide | K | 0.9 | 0.9 | 1.0 | 1.1 | 1.2 | 1.3 | 1.3 |
| Volumetric capacity | kJ/m3 | 1060 | 1061 | 1060 | 1057 | 1053 | 1049 | 1043 |
| Cooling COP | | 2.35 | 2.35 | 2.34 | 2.34 | 2.34 | 2.34 | 2.33 |

| | | R744 (weight %) | | | | |
|---|---|---|---|---|---|---|
| | | 4% | 4% | 4% | 4% | 4% |
| | | R170 (weight %) | | | | |
| | | 80.0% | 84.0% | 88.0% | 92.0% | 96% |
| | | R1132a (weight %) | | | | |
| | | 16.00% | 12.00% | 8.00% | 4.00% | 0.00% |
| GWP | | 3 | 3 | 3 | 3 | 3 |
| Evaporator pressure | bar | 1.32 | 1.32 | 1.31 | 1.30 | 1.29 |
| Condenser pressure | bar | 8.41 | 8.35 | 8.29 | 8.22 | 8.16 |
| Pressure ratio | | 6.35 | 6.35 | 6.34 | 6.34 | 6.33 |
| Volumetric efficiency | | 90.7% | 90.8% | 90.8% | 90.9% | 91.0% |
| Discharge temperature | °C. | 36.7 | 37.7 | 38.7 | 39.7 | 40.6 |
| Evaporator temp glide | K | 0.8 | 0.8 | 0.9 | 0.9 | 0.9 |
| Condenser temp glide | K | 1.4 | 1.4 | 1.5 | 1.5 | 1.4 |
| Volumetric capacity | kJ/m3 | 1037 | 1031 | 1024 | 1016 | 1008 |
| Cooling COP | | 2.33 | 2.33 | 2.32 | 2.32 | 2.31 |

TABLE 13

Refrigeration performance modelling data for R-1132a/R-170/CO₂ ternary system with 8% by weight CO₂

| | | R744 (weight %) | | | | | | |
|---|---|---|---|---|---|---|---|---|
| | | 8.0% | 8.0% | 8.0% | 8.0% | 8.0% | 8.0% | 8.0% |
| | | R170 (weight %) | | | | | | |
| | | 4.0% | 8.0% | 12.0% | 16.0% | 20.0% | 24.0% | 28.0% |
| | | R1132a (weight %) | | | | | | |
| | | 88.0% | 84.0% | 80.0% | 76.0% | 72.0% | 68.0% | 64.0% |
| GWP | | 4 | 4 | 4 | 4 | 4 | 4 | 3 |
| Evaporator pressure | bar | 1.05 | 1.12 | 1.17 | 1.21 | 1.25 | 1.29 | 1.32 |
| Condenser pressure | bar | 7.65 | 7.96 | 8.21 | 8.42 | 8.60 | 8.74 | 8.85 |
| Pressure ratio | | 7.25 | 7.13 | 7.03 | 6.93 | 6.85 | 6.78 | 6.71 |
| Volumetric efficiency | | 87.8% | 88.1% | 88.4% | 88.7% | 88.9% | 89.1% | 89.3% |
| Discharge temperature | °C. | 17.7 | 19.2 | 20.5 | 21.7 | 22.8 | 23.9 | 24.9 |
| Evaporator temp glide | K | 1.0 | 1.4 | 1.5 | 1.5 | 1.4 | 1.3 | 1.1 |
| Condenser temp glide | K | 1.6 | 1.8 | 1.9 | 1.8 | 1.7 | 1.5 | 1.4 |

TABLE 13-continued

Refrigeration performance modelling data for R-1132a/R-170/$CO_2$ ternary system with 8% by weight $CO_2$

| Volumetric capacity | kJ/m3 | 834 | 881 | 921 | 956 | 987 | 1012 | 1034 |
|---|---|---|---|---|---|---|---|---|
| Cooling COP | | 2.27 | 2.28 | 2.29 | 2.30 | 2.31 | 2.31 | 2.32 |

| | | \multicolumn{5}{c}{R744 (weight %)} | | | |
|---|---|---|---|---|---|---|

| | | 8.0% | 8.0% | 8.0% | 8.0% | 8.0% |
|---|---|---|---|---|---|---|
| | | \multicolumn{5}{c}{R170 (weight %)} |
| | | 32.0% | 36.0% | 40.0% | 44.0% | 48.0% |
| | | \multicolumn{5}{c}{R1132a (weight %)} |
| | | 60.0% | 56.0% | 52.0% | 48.0% | 44.0% |
| GWP | | 3 | 3 | 3 | 3 | 3 |
| Evaporator pressure | bar | 1.34 | 1.36 | 1.38 | 1.39 | 1.39 |
| Condenser pressure | bar | 8.93 | 8.98 | 9.02 | 9.03 | 9.03 |
| Pressure ratio | | 6.65 | 6.60 | 6.55 | 6.51 | 6.47 |
| Volumetric efficiency | | 89.5% | 89.7% | 89.9% | 90.0% | 90.1% |
| Discharge temperature | °C. | 25.9 | 26.9 | 27.9 | 29.0 | 30.0 |
| Evaporator temp glide | K | 1.0 | 0.9 | 0.8 | 0.8 | 0.8 |
| Condenser temp glide | K | 1.3 | 1.3 | 1.3 | 1.4 | 1.4 |
| Volumetric capacity | kJ/m3 | 1052 | 1067 | 1078 | 1086 | 1091 |
| Cooling COP | | 2.32 | 2.33 | 2.33 | 2.33 | 2.33 |

| | | \multicolumn{6}{c}{R744 (weight %)} |
|---|---|---|---|---|---|---|---|
| | | 8.0% | 8.0% | 8.0% | 8.0% | 8.0% | 8.0% |
| | | \multicolumn{6}{c}{R170 (weight %)} |
| | | 52.0% | 56.0% | 60.0% | 64.0% | 68.0% | 70.0% |
| | | \multicolumn{6}{c}{R1132a (weight %)} |
| | | 44.00% | 40.00% | 36.00% | 32.00% | 28.00% | 26.00% |
| GWP | | 3 | 3 | 3 | 3 | 3 | 3 |
| Evaporator pressure | bar | 1.40 | 1.40 | 1.40 | 1.40 | 1.39 | 1.39 |
| Condenser pressure | bar | 9.02 | 8.99 | 8.96 | 8.92 | 8.87 | 8.82 |
| Pressure ratio | | 6.45 | 6.42 | 6.40 | 6.39 | 6.37 | 6.36 |
| Volumetric efficiency | | 90.2% | 90.3% | 90.4% | 90.5% | 90.6% | 90.7% |
| Discharge temperature | °C. | 31.1 | 32.2 | 33.3 | 34.4 | 35.5 | 36.6 |
| Evaporator temp glide | K | 0.8 | 0.9 | 1.0 | 1.1 | 1.2 | 1.3 |
| Condenser temp glide | K | 1.5 | 1.7 | 1.8 | 1.9 | 2.1 | 2.2 |
| Volumetric capacity | kJ/m3 | 1094 | 1095 | 1094 | 1092 | 1088 | 1084 |
| Cooling COP | | 2.33 | 2.33 | 2.33 | 2.33 | 2.33 | 2.33 |

TABLE 13-continued

Refrigeration performance modelling data for R-1132a/R-170/$CO_2$ ternary system with 8% by weight $CO_2$

| | | R744 (weight %) | | | | |
|---|---|---|---|---|---|---|
| | | 8.0% | 8.0% | 8.0% | 8.0% | 8.0% |
| | | R170 (weight %) | | | | |
| | | 76.0% | 80.0% | 84.0% | 88.0% | 92.0% |
| | | R1132a (weight %) | | | | |
| | | 20.00% | 16.00% | 12.00% | 8.00% | 4.00% |
| GWP | | 3 | 3 | 3 | 3 | 3 |
| Evaporator pressure | bar | 1.38 | 1.37 | 1.36 | 1.36 | 1.35 |
| Condenser pressure | bar | 8.76 | 8.70 | 8.64 | 8.58 | 8.51 |
| Pressure ratio | | 6.35 | 6.34 | 6.33 | 6.33 | 6.32 |
| Volumetric efficiency | | 90.8% | 90.8% | 90.9% | 90.9% | 91.0% |
| Discharge temperature | ° C. | 37.6 | 38.7 | 39.7 | 40.7 | 41.7 |
| Evaporator temp glide | K | 1.4 | 1.5 | 1.5 | 1.6 | 1.7 |
| Condenser temp glide | K | 2.3 | 2.4 | 2.5 | 2.5 | 2.6 |
| Volumetric capacity | kJ/m3 | 1078 | 1072 | 1066 | 1059 | 1052 |
| Cooling COP | | 2.32 | 2.32 | 2.32 | 2.31 | 2.31 |

TABLE 14

Refrigeration performance modelling data for R-1132a/R-170/$CO_2$ ternary system with 12% by weight $CO_2$

| | | R744 (weight %) | | | | | |
|---|---|---|---|---|---|---|---|
| | | 12.0% | 12.0% | 12.0% | 12.0% | 12.0% | 12.0% |
| | | R170 (weight %) | | | | | |
| | | 4.0% | 8.0% | 12.0% | 16.0% | 20.0% | 24.0% |
| | | R1132a (weight %) | | | | | |
| | | 84.0% | 80.0% | 76.0% | 72.0% | 68.0% | 64.0% |
| GWP | | 4 | 4 | 4 | 3 | 3 | 3 |
| Evaporator pressure | bar | 1.08 | 1.15 | 1.20 | 1.25 | 1.29 | 1.33 |
| Condenser pressure | bar | 7.91 | 8.22 | 8.49 | 8.71 | 8.89 | 9.03 |
| Pressure ratio | | 7.29 | 7.17 | 7.06 | 6.96 | 6.87 | 6.79 |
| Volumetric efficiency | | 87.9% | 88.2% | 88.5% | 88.8% | 89.0% | 89.2% |
| Discharge temperature | ° C. | 20.2 | 21.6 | 22.9 | 24.0 | 25.1 | 26.1 |
| Evaporator temp glide | K | 1.1 | 1.5 | 1.7 | 1.7 | 1.6 | 1.4 |
| Condenser temp glide | K | 1.9 | 2.1 | 2.2 | 2.1 | 2.0 | 1.8 |
| Volumetric capacity | kJ/m3 | 860 | 909 | 950 | 986 | 1017 | 1043 |
| Cooling COP | | 2.26 | 2.27 | 2.28 | 2.29 | 2.30 | 2.30 |

TABLE 14-continued

Refrigeration performance modelling data for R-1132a/R-170/CO$_2$ ternary system with 12% by weight CO$_2$

| | | R744 (weight %) | | | | |
|---|---|---|---|---|---|---|
| | | 12.0% | 12.0% | 12.0% | 12.0% | 12.0% |
| | | R170 (weight %) | | | | |
| | | 28.0% | 32.0% | 36.0% | 40.0% | 44.0% |
| | | R1132a (weight %) | | | | |
| | | 60.0% | 56.0% | 52.0% | 48.0% | 44.0% |
| GWP | | 3 | 3 | 3 | 3 | 3 |
| Evaporator pressure | bar | 1.36 | 1.39 | 1.41 | 1.42 | 1.43 |
| Condenser pressure | bar | 9.14 | 9.23 | 9.28 | 9.32 | 9.33 |
| Pressure ratio | | 6.72 | 6.66 | 6.60 | 6.55 | 6.51 |
| Volumetric efficiency | | 89.4% | 89.6% | 89.8% | 89.9% | 90.1% |
| Discharge temperature | °C. | 27.1 | 28.1 | 29.0 | 30.0 | 31.0 |
| Evaporator temp glide | K | 1.3 | 1.2 | 1.1 | 1.0 | 1.0 |
| Condenser temp glide | K | 1.7 | 1.7 | 1.7 | 1.7 | 1.8 |
| Volumetric capacity | kJ/m3 | 1066 | 1084 | 1099 | 1111 | 1119 |
| Cooling COP | | 2.31 | 2.31 | 2.31 | 2.32 | 2.32 |

| | | R744 (weight %) | | | | | |
|---|---|---|---|---|---|---|---|
| | | 12.0% | 12.0% | 12.0% | 12.0% | 12.0% | 12.0% |
| | | R170 (weight %) | | | | | |
| | | 48.0% | 52.0% | 56.0% | 60.0% | 64.0% | 68.0% |
| | | R1132a (weight %) | | | | | |
| | | 40.0% | 36.0% | 32.0% | 28.0% | 24.0% | 20.0% |
| GWP | | 3 | 3 | 3 | 3 | 3 | 3 |
| Evaporator pressure | bar | 1.44 | 1.45 | 1.45 | 1.45 | 1.44 | 1.44 |
| Condenser pressure | bar | 9.33 | 9.31 | 9.28 | 9.25 | 9.20 | 9.16 |
| Pressure ratio | | 6.47 | 6.44 | 6.42 | 6.40 | 6.38 | 6.36 |
| Volumetric efficiency | | 90.2% | 90.3% | 90.4% | 90.5% | 90.6% | 90.7% |
| Discharge temperature | °C. | 32.1 | 33.1 | 34.2 | 35.3 | 36.4 | 37.5 |
| Evaporator temp glide | K | 1.0 | 1.1 | 1.2 | 1.4 | 1.5 | 1.6 |
| Condenser temp glide | K | 1.9 | 2.1 | 2.3 | 2.4 | 2.6 | 2.8 |
| Volumetric capacity | kJ/m3 | 1125 | 1128 | 1128 | 1127 | 1125 | 1122 |
| Cooling COP | | 2.32 | 2.32 | 2.32 | 2.32 | 2.32 | 2.32 |

| | | R744 (weight %) | | | | |
|---|---|---|---|---|---|---|
| | | 12.0% | 12.0% | 12.0% | 12.0% | 12.0% |
| | | R170 (weight %) | | | | |
| | | 70.0% | 76.0% | 80.0% | 84.0% | 88.0% |
| | | R1132a (weight %) | | | | |
| | | 18.0% | 12.0% | 8.0% | 4.0% | 0.0% |
| GWP | | 3 | 3 | 3 | 3 | 3 |
| Evaporator pressure | bar | 1.43 | 1.43 | 1.42 | 1.41 | 1.40 |
| Condenser pressure | bar | 9.10 | 9.04 | 8.98 | 8.92 | 8.86 |
| Pressure ratio | | 6.35 | 6.33 | 6.32 | 6.31 | 6.31 |

TABLE 14-continued

Refrigeration performance modelling data for R-1132a/R-170/CO₂ ternary system with 12% by weight $CO_2$

| | | | | | | |
|---|---|---|---|---|---|---|
| Volumetric efficiency | | 90.8% | 90.9% | 90.9% | 91.0% | 91.0% |
| Discharge temperature | °C. | 38.5 | 39.6 | 40.6 | 41.6 | 42.6 |
| Evaporator temp glide | K | 1.8 | 1.9 | 2.1 | 2.2 | 2.3 |
| Condenser temp glide | K | 3.0 | 3.1 | 3.3 | 3.4 | 3.5 |
| Volumetric capacity | kJ/m3 | 1117 | 1112 | 1107 | 1100 | 1094 |
| Cooling COP | | 2.32 | 2.31 | 2.31 | 2.31 | 2.31 |

TABLE 15

Refrigeration performance modelling data for R-1132a/R-170/CO₂ ternary system with 16% by weight $CO_2$

| | | R744 (weight %) | | | | | |
|---|---|---|---|---|---|---|---|
| | | 16.0% | 16.0% | 16.0% | 16.0% | 16.0% | 16.0% |
| | | R170 (weight %) | | | | | |
| | | 4.0% | 8.0% | 12.0% | 16.0% | 20.0% | 24.0% |
| | | R1132a (weight %) | | | | | |
| | | 80.0% | 76.0% | 72.0% | 68.0% | 64.0% | 60.0% |
| GWP | | 3 | 3 | 3 | 3 | 3 | 3 |
| Evaporator pressure | bar | 1.11 | 1.18 | 1.24 | 1.29 | 1.33 | 1.37 |
| Condenser pressure | bar | 8.15 | 8.48 | 8.75 | 8.98 | 9.17 | 9.32 |
| Pressure ratio | | 7.33 | 7.20 | 7.08 | 6.98 | 6.89 | 6.81 |
| Volumetric efficiency | | 88.0% | 88.3% | 88.6% | 88.9% | 89.1% | 89.3% |
| Discharge temperature | °C. | 22.8 | 24.1 | 25.3 | 26.4 | 27.4 | 28.4 |
| Evaporator temp glide | K | 1.2 | 1.6 | 1.8 | 1.8 | 1.7 | 1.6 |
| Condenser temp glide | K | 2.1 | 2.3 | 2.4 | 2.3 | 2.2 | 2.1 |
| Volumetric capacity | kJ/m3 | 886 | 936 | 978 | 1015 | 1046 | 1074 |
| Cooling COP | | 2.26 | 2.27 | 2.27 | 2.28 | 2.29 | 2.29 |

| | | R744 (weight %) | | | | |
|---|---|---|---|---|---|---|
| | | 16.0% | 16.0% | 16.0% | 16.0% | 16.0% |
| | | R170 (weight %) | | | | |
| | | 28.0% | 32.0% | 36.0% | 40.0% | 44.0% |
| | | R1132a (weight %) | | | | |
| | | 56.0% | 52.0% | 48.0% | 44.0% | 40.0% |
| GWP | | 3 | 3 | 3 | 3 | 3 |
| Evaporator pressure | bar | 1.40 | 1.43 | 1.45 | 1.47 | 1.48 |
| Condenser pressure | bar | 9.43 | 9.52 | 9.57 | 9.61 | 9.62 |
| Pressure ratio | | 6.73 | 6.67 | 6.60 | 6.55 | 6.51 |
| Volumetric efficiency | | 89.5% | 89.7% | 89.9% | 90.0% | 90.2% |
| Discharge temperature | °C. | 29.3 | 30.2 | 31.1 | 32.0 | 33.0 |
| Evaporator temp glide | K | 1.4 | 1.3 | 1.2 | 1.2 | 1.2 |
| Condenser temp glide | K | 2.0 | 1.9 | 2.0 | 2.0 | 2.2 |

TABLE 15-continued

Refrigeration performance modelling data for R-1132a/R-170/CO$_2$ ternary system with 16% by weight CO$_2$

| | | | | | | |
|---|---|---|---|---|---|---|
| Volumetric capacity | kJ/m3 | 1097 | 1116 | 1131 | 1143 | 1152 |
| Cooling COP | | 2.29 | 2.30 | 2.30 | 2.31 | 2.31 |

| | | R744 (weight %) | | | | | |
|---|---|---|---|---|---|---|---|
| | | 16.0% | 16.0% | 16.0% | 16.0% | 16.0% | 16.0% |
| | | R170 (weight %) | | | | | |
| | | 48.0% | 52.0% | 56.0% | 60.0% | 64.0% | 68.0% |
| | | R1132a (weight %) | | | | | |
| | | 36.0% | 32.0% | 28.0% | 24.0% | 20.0% | 16.0% |
| GWP | | 3 | 3 | 3 | 3 | 3 | 3 |
| Evaporator pressure | bar | 1.49 | 1.49 | 1.49 | 1.49 | 1.49 | 1.49 |
| Condenser pressure | bar | 9.62 | 9.60 | 9.57 | 9.53 | 9.48 | 9.43 |
| Pressure ratio | | 6.47 | 6.43 | 6.41 | 6.38 | 6.36 | 6.35 |
| Volumetric efficiency | | 90.3% | 90.4% | 90.5% | 90.6% | 90.7% | 90.8% |
| Discharge temperature | °C. | 34.0 | 35.1 | 36.1 | 37.2 | 38.3 | 39.4 |
| Evaporator temp glide | K | 1.3 | 1.4 | 1.5 | 1.7 | 1.9 | 2.1 |
| Condenser temp glide | K | 2.3 | 2.5 | 2.7 | 3.0 | 3.2 | 3.4 |
| Volumetric capacity | kJ/m3 | 1157 | 1160 | 1161 | 1160 | 1158 | 1154 |
| Cooling COP | | 2.31 | 2.31 | 2.31 | 2.31 | 2.31 | 2.31 |

| | | R744 (weight %) | | | |
|---|---|---|---|---|---|
| | | 16.0% | 16.0% | 16.0% | 16.0% |
| | | R170 (weight %) | | | |
| | | 70.0% | 76.0% | 80.0% | 84.0% |
| | | R1132a (weight %) | | | |
| | | 12.0% | 8.0% | 4.0% | 0.0% |
| GWP | | 3 | 3 | 3 | 3 |
| Evaporator pressure | bar | 1.48 | 1.47 | 1.47 | 1.46 |
| Condenser pressure | bar | 9.37 | 9.31 | 9.25 | 9.19 |
| Pressure ratio | | 6.33 | 6.32 | 6.30 | 6.29 |
| Volumetric efficiency | | 90.9% | 91.0% | 91.0% | 91.1% |
| Discharge temperature | °C. | 40.4 | 41.5 | 42.5 | 43.5 |
| Evaporator temp glide | K | 2.2 | 2.4 | 2.6 | 2.8 |
| Condenser temp glide | K | 3.6 | 3.8 | 4.0 | 4.1 |
| Volumetric capacity | kJ/m3 | 1150 | 1145 | 1140 | 1134 |
| Cooling COP | | 2.31 | 2.31 | 2.30 | 2.30 |

TABLE 16

Refrigeration performance modelling data for R-1132a/R-116/R-170 ternary system with 4% by weight R-1132a

| | | R170 (weight %) | | | | | | |
|---|---|---|---|---|---|---|---|---|
| | | 4.0% | 8.0% | 12.0% | 16.0% | 20.0% | 24.0% | 28.0% |
| | | R1132a (weight %) | | | | | | |
| | | 4.0% | 4.0% | 4.0% | 4.0% | 4.0% | 4.0% | 4.0% |
| | | R116 (weight %) | | | | | | |
| | | 92.0% | 88.0% | 84.0% | 80.0% | 76.0% | 72.0% | 68.0% |
| GWP | | 11224 | 10736 | 10249 | 9761 | 9273 | 8785 | 8297 |
| Evaporator pressure | bar | 0.96 | 1.13 | 1.25 | 1.35 | 1.42 | 1.48 | 1.52 |
| Condenser pressure | bar | 7.09 | 7.90 | 8.49 | 8.91 | 9.20 | 9.38 | 9.45 |
| Pressure ratio | | 7.36 | 6.97 | 6.76 | 6.62 | 6.48 | 6.35 | 6.22 |
| Volumetric efficiency | | 85.4% | 86.5% | 87.2% | 87.8% | 88.3% | 88.8% | 89.2% |
| Discharge temperature | °C. | −6.1 | −2.4 | 0.6 | 3.0 | 5.0 | 6.7 | 8.2 |
| Evaporator temp glide | K | 4.4 | 5.5 | 5.0 | 3.8 | 2.5 | 1.3 | 0.4 |
| Condenser temp glide | K | 4.8 | 4.7 | 3.5 | 2.2 | 1.1 | 0.3 | 0.0 |
| Volumetric capacity | kJ/m3 | 762 | 898 | 990 | 1057 | 1112 | 1156 | 1189 |
| Cooling COP | | 2.40 | 2.46 | 2.47 | 2.47 | 2.48 | 2.49 | 2.51 |

| | | R170 (weight %) | | | | |
|---|---|---|---|---|---|---|
| | | 32.0% | 36.0% | 40.0% | 44.0% | 48.0% |
| | | R1132a (weight %) | | | | |
| | | 4.0% | 4.0% | 4.0% | 4.0% | 4.0% |
| | | R116 (weight %) | | | | |
| | | 64.0% | 60.0% | 56.0% | 52.0% | 48.0% |
| GWP | | 7809 | 7321 | 6833 | 6345 | 5858 |
| Evaporator pressure | bar | 1.54 | 1.53 | 1.52 | 1.50 | 1.48 |
| Condenser pressure | bar | 9.45 | 9.40 | 9.32 | 9.22 | 9.12 |
| Pressure ratio | | 6.15 | 6.13 | 6.13 | 6.14 | 6.15 |
| Volumetric efficiency | | 89.6% | 89.8% | 89.9% | 90.1% | 90.2% |
| Discharge temperature | °C. | 10.1 | 12.5 | 15.0 | 17.5 | 19.8 |
| Evaporator temp glide | K | 0.0 | 0.1 | 0.4 | 0.7 | 1.0 |
| Condenser temp glide | K | 0.0 | 0.2 | 0.5 | 0.8 | 1.1 |
| Volumetric capacity | kJ/m3 | 1204 | 1203 | 1193 | 1180 | 1166 |
| Cooling COP | | 2.51 | 2.51 | 2.49 | 2.48 | 2.47 |

| | | R170 (weight %) | | | | | |
|---|---|---|---|---|---|---|---|
| | | 52.0% | 56.0% | 60.0% | 64.0% | 68.0% | 72.0% |
| | | R1132a (weight %) | | | | | |
| | | 4.0% | 4.0% | 4.0% | 4.0% | 4.0% | 4.0% |
| | | R116 (weight %) | | | | | |
| | | 44.0% | 40.0% | 36.0% | 32.0% | 28.0% | 24.0% |
| GWP | | 5370 | 4882 | 4394 | 3906 | 3418 | 2930 |
| Evaporator pressure | bar | 1.46 | 1.44 | 1.43 | 1.41 | 1.39 | 1.36 |
| Condenser pressure | bar | 9.02 | 8.91 | 8.81 | 8.70 | 8.60 | 8.49 |
| Pressure ratio | | 6.16 | 6.17 | 6.18 | 6.19 | 6.21 | 6.22 |

TABLE 16-continued

Refrigeration performance modelling data for R-1132a/R-116/R-170 ternary system with 4% by weight R-1132a

| | | | | | | | |
|---|---|---|---|---|---|---|---|
| Volumetric efficiency | | 90.3% | 90.4% | 90.5% | 90.5% | 90.6% | 90.7% |
| Discharge temperature | ° C. | 21.9 | 23.9 | 25.8 | 27.5 | 29.2 | 30.8 |
| Evaporator temp glide | K | 1.2 | 1.4 | 1.5 | 1.6 | 1.6 | 1.5 |
| Condenser temp glide | K | 1.3 | 1.5 | 1.6 | 1.7 | 1.7 | 1.6 |
| Volumetric capacity | kJ/m3 | 1152 | 1137 | 1122 | 1107 | 1091 | 1075 |
| Cooling COP | | 2.46 | 2.45 | 2.43 | 2.42 | 2.41 | 2.40 |

| | | R170 (weight %) | | | | |
|---|---|---|---|---|---|---|
| | | 76.0% | 80.0% | 84.0% | 88.0% | 92.0% |
| | | R1132a (weight %) | | | | |
| | | 4.0% | 4.0% | 4.0% | 4.0% | 4.0% |
| | | R116 (weight %) | | | | |
| | | 20.0% | 16.0% | 12.0% | 8.0% | 4.0% |
| GWP | | 2442 | 1955 | 1467 | 979 | 491 |
| Evaporator pressure | bar | 1.34 | 1.32 | 1.30 | 1.28 | 1.26 |
| Condenser pressure | bar | 8.39 | 8.28 | 8.18 | 8.07 | 7.96 |
| Pressure ratio | | 6.24 | 6.26 | 6.28 | 6.30 | 6.32 |
| Volumetric efficiency | | 90.7% | 90.8% | 90.8% | 90.8% | 90.9% |
| Discharge temperature | ° C. | 32.3 | 33.7 | 35.0 | 36.3 | 37.5 |
| Evaporator temp glide | K | 1.3 | 1.1 | 0.9 | 0.6 | 0.4 |
| Condenser temp glide | K | 1.5 | 1.3 | 1.1 | 0.8 | 0.5 |
| Volumetric capacity | kJ/m3 | 1058 | 1041 | 1023 | 1006 | 989 |
| Cooling COP | | 2.39 | 2.37 | 2.36 | 2.35 | 2.34 |

TABLE 17

Refrigeration performance modelling data for R-1132a/R-116/R-170 ternary system with 8% by weight R-1132a

| | | R170 (weight %) | | | | | |
|---|---|---|---|---|---|---|---|
| | | 4.0% | 8.0% | 12.0% | 16.0% | 20.0% | 24.0% |
| | | R1132a (weight %) | | | | | |
| | | 8.0% | 8.0% | 8.0% | 8.0% | 8.0% | 8.0% |
| | | R116 (weight %) | | | | | |
| | | 88.0% | 84.0% | 80.0% | 76.0% | 72.0% | 68.0% |
| GWP | | 10736 | 10249 | 9761 | 9273 | 8785 | 8297 |
| Evaporator pressure | bar | 1.01 | 1.16 | 1.28 | 1.37 | 1.43 | 1.49 |
| Condenser pressure | bar | 7.31 | 8.07 | 8.61 | 8.99 | 9.25 | 9.40 |
| Pressure ratio | | 7.27 | 6.93 | 6.74 | 6.59 | 6.45 | 6.32 |
| Volumetric efficiency | | 85.7% | 86.7% | 87.4% | 87.9% | 88.5% | 88.9% |
| Discharge temperature | ° C. | −5.2 | −1.7 | 1.1 | 3.4 | 5.3 | 7.0 |
| Evaporator temp glide | K | 4.2 | 4.9 | 4.3 | 3.1 | 1.9 | 0.9 |
| Condenser temp glide | K | 4.3 | 4.0 | 2.9 | 1.7 | 0.8 | 0.2 |

TABLE 17-continued

Refrigeration performance modelling data for R-1132a/R-116/R-170 ternary system with 8% by weight R-1132a

| | | | | | | | |
|---|---|---|---|---|---|---|---|
| Volumetric capacity | kJ/m3 | 782 | 908 | 996 | 1062 | 1115 | 1157 |
| Cooling COP | | 2.37 | 2.42 | 2.44 | 2.45 | 2.46 | 2.48 |

| | | R170 (weight %) | | | | |
|---|---|---|---|---|---|---|
| | | 28.0% | 32.0% | 36.0% | 40.0% | 44.0% |
| | | R1132a (weight %) | | | | |
| | | 8.0% | 8.0% | 8.0% | 8.0% | 8.0% |
| | | R116 (weight %) | | | | |
| | | 64.0% | 60.0% | 56.0% | 52.0% | 48.0% |
| GWP | | 7809 | 7321 | 6833 | 6346 | 5858 |
| Evaporator pressure | bar | 1.52 | 1.53 | 1.52 | 1.51 | 1.49 |
| Condenser pressure | bar | 9.45 | 9.43 | 9.37 | 9.29 | 9.19 |
| Pressure ratio | | 6.21 | 6.16 | 6.15 | 6.15 | 6.16 |
| Volumetric efficiency | | 89.3% | 89.6% | 89.8% | 89.9% | 90.1% |
| Discharge temperature | ° C. | 8.7 | 10.8 | 13.2 | 15.7 | 18.1 |
| Evaporator temp glide | K | 0.2 | 0.0 | 0.2 | 0.5 | 0.8 |
| Condenser temp glide | K | 0.0 | 0.1 | 0.3 | 0.6 | 0.9 |
| Volumetric capacity | kJ/m3 | 1185 | 1196 | 1192 | 1183 | 1171 |
| Cooling COP | | 2.49 | 2.50 | 2.49 | 2.48 | 2.47 |

| | | R170 (weight %) | | | | | |
|---|---|---|---|---|---|---|---|
| | | 48.0% | 52.0% | 56.0% | 60.0% | 64.0% | 68.0% |
| | | R1132a (weight %) | | | | | |
| | | 8.0% | 8.0% | 8.0% | 8.0% | 8.0% | 8.0% |
| | | R116 (weight %) | | | | | |
| | | 44.0% | 40.0% | 36.0% | 32.0% | 28.0% | 24.0% |
| GWP | | 5370 | 4882 | 4394 | 3906 | 3418 | 2930 |
| Evaporator pressure | bar | 1.47 | 1.45 | 1.44 | 1.42 | 1.40 | 1.37 |
| Condenser pressure | bar | 9.09 | 8.99 | 8.88 | 8.77 | 8.67 | 8.56 |
| Pressure ratio | | 6.17 | 6.18 | 6.19 | 6.20 | 6.21 | 6.23 |
| Volumetric efficiency | | 90.2% | 90.3% | 90.4% | 90.5% | 90.5% | 90.6% |
| Discharge temperature | ° C. | 20.3 | 22.4 | 24.3 | 26.2 | 27.9 | 29.5 |
| Evaporator temp glide | K | 1.0 | 1.2 | 1.4 | 1.4 | 1.4 | 1.4 |
| Condenser temp glide | K | 1.1 | 1.3 | 1.4 | 1.5 | 1.5 | 1.5 |
| Volumetric capacity | kJ/m3 | 1157 | 1143 | 1129 | 1114 | 1098 | 1082 |
| Cooling COP | | 2.46 | 2.45 | 2.44 | 2.42 | 2.41 | 2.40 |

TABLE 17-continued

Refrigeration performance modelling data for R-1132a/R-116/R-170 ternary system with 8% by weight R-1132a

| | | | R170 (weight %) | | | | |
|---|---|---|---|---|---|---|---|
| | | | 72.0% | 76.0% | 80.0% | 84.0% | 88.0% |
| | | | \multicolumn{5}{c}{R1132a (weight %)} |
| | | | 8.0% | 8.0% | 8.0% | 8.0% | 8.0% |
| | | | \multicolumn{5}{c}{R116 (weight %)} |
| | | | 20.0% | 16.0% | 12.0% | 8.0% | 4.0% |
| GWP | | | 2442 | 1955 | 1467 | 979 | 491 |
| Evaporator pressure | bar | | 1.35 | 1.33 | 1.31 | 1.29 | 1.27 |
| Condenser pressure | bar | | 8.46 | 8.35 | 8.24 | 8.14 | 8.03 |
| Pressure ratio | | | 6.25 | 6.26 | 6.29 | 6.31 | 6.32 |
| Volumetric efficiency | | | 90.6% | 90.7% | 90.7% | 90.8% | 90.8% |
| Discharge temperature | °C. | | 31.1 | 32.6 | 33.9 | 35.2 | 36.5 |
| Evaporator temp glide | K | | 1.3 | 1.1 | 0.9 | 0.6 | 0.4 |
| Condenser temp glide | K | | 1.4 | 1.3 | 1.1 | 0.8 | 0.5 |
| Volumetric capacity | kJ/m3 | | 1065 | 1048 | 1031 | 1014 | 997 |
| Cooling COP | | | 2.39 | 2.38 | 2.36 | 2.35 | 2.34 |

TABLE 18

Refrigeration performance modelling data for R-1132a/R-116/R-170 ternary system with 12-20% by weight R-1132a

| | | R170 (weight %) | | | | | |
|---|---|---|---|---|---|---|---|
| | | 4.0% | 8.0% | 12.0% | 16.0% | 20.0% | 24.0% |
| | | \multicolumn{6}{c}{R1132a (weight %)} |
| | | 12.0% | 12.0% | 12.0% | 12.0% | 12.0% | 12.0% |
| | | \multicolumn{6}{c}{R116 (weight %)} |
| | | 84.0% | 80.0% | 76.0% | 72.0% | 68.0% | 64.0% |
| GWP | | 10249 | 9761 | 9273 | 8785 | 8297 | 7809 |
| Evaporator pressure | bar | 1.04 | 1.19 | 1.30 | 1.38 | 1.44 | 1.49 |
| Condenser pressure | bar | 7.49 | 8.20 | 8.70 | 9.05 | 9.27 | 9.39 |
| Pressure ratio | | 7.20 | 6.90 | 6.70 | 6.56 | 6.42 | 6.30 |
| Volumetric efficiency | | 86.0% | 86.9% | 87.5% | 88.1% | 88.6% | 89.0% |
| Discharge temperature | °C. | −4.4 | −1.1 | 1.6 | 3.8 | 5.6 | 7.4 |
| Evaporator temp glide | K | 3.9 | 4.3 | 3.6 | 2.5 | 1.5 | 0.6 |
| Condenser temp glide | K | 3.7 | 3.3 | 2.3 | 1.3 | 0.5 | 0.1 |
| Volumetric capacity | kJ/m3 | 798 | 916 | 1001 | 1065 | 1117 | 1155 |
| Cooling COP | | 2.34 | 2.39 | 2.42 | 2.43 | 2.45 | 2.47 |

TABLE 18-continued

Refrigeration performance modelling data for R-1132a/R-116/R-170 ternary system with 12-20% by weight R-1132a

| | | | | | | | | | | | | | | | | |
|---|---|---|---|---|---|---|---|---|---|---|---|---|---|---|---|---|
| R170 (weight %) | | 28.0% | 4.0% | 8.0% | 12.0% | 16.0% | 20.0% | 24.0% | 28.0% | 4.0% | 8.0% | 12.0% | 16.0% | 20.0% | 24.0% | 28.0% |
| R1132a (weight %) | | 12.0% | 16.0% | 16.0% | 16.0% | 16.0% | 16.0% | 16.0% | 16.0% | 20.0% | 20.0% | 20.0% | 20.0% | 20.0% | 20.0% | 20.0% |
| R116 (weight %) | | 60.0% | 80.0% | 76.0% | 72.0% | 68.0% | 64.0% | 60.0% | 56.0% | 76.0% | 72.0% | 68.0% | 64.0% | 60.0% | 56.0% | 52.0% |
| GWP | | 7321 | 9761 | 9273 | 8785 | 8297 | 7809 | 7321 | 6833 | 9273 | 8785 | 8297 | 7809 | 7321 | 6834 | 6346 |
| Evaporator pressure | bar | 1.52 | 1.07 | 1.21 | 1.31 | 1.39 | 1.45 | 1.49 | 1.51 | 1.10 | 1.23 | 1.32 | 1.40 | 1.45 | 1.48 | 1.50 |
| Condenser pressure | bar | 9.43 | 7.65 | 8.30 | 8.76 | 9.08 | 9.27 | 9.37 | 9.39 | 7.77 | 8.38 | 8.80 | 9.08 | 9.25 | 9.33 | 9.34 |
| Pressure ratio | | 6.21 | 7.13 | 6.86 | 6.67 | 6.53 | 6.40 | 6.29 | 6.22 | 7.07 | 6.82 | 6.65 | 6.50 | 6.38 | 6.29 | 6.24 |
| Volumetric efficiency | | 89.4% | 86.2% | 87.1% | 87.7% | 88.2% | 88.7% | 89.1% | 89.4% | 86.5% | 87.2% | 87.8% | | | | |
| Discharge temperature | °C. | 9.3 | −3.7 | −0.5 | 2.0 | 4.2 | 6.0 | 7.9 | 9.9 | −3.1 | 0.0 | 2.5 | | | | |
| Evaporator temp glide | K | 0.1 | 3.4 | 3.6 | 3.0 | 2.0 | 1.1 | 0.4 | 0.1 | 2.9 | 3.0 | 2.4 | | | | |
| Condenser temp glide | K | 0.0 | 3.1 | 2.7 | 1.8 | 1.0 | 0.4 | 0.1 | 0.1 | 2.5 | 2.2 | 1.4 | | | | |
| Volumetric capacity | kJ/m3 | 1178 | 811 | 923 | 1004 | 1067 | 1115 | 1150 | 1168 | 822 | 928 | 1007 | | | | |
| Cooling COP | | 2.48 | 2.31 | 2.37 | 2.40 | 2.42 | 2.44 | 2.46 | 2.47 | 2.29 | 2.35 | 2.38 | | | | |

TABLE 18-continued

Refrigeration performance modelling data for R-1132a/R-116/R-170 ternary system with 12-20% by weight R-1132a

| | | | | | |
|---|---|---|---|---|---|
| Volumetric efficiency | | 88.3% | 88.8% | 89.1% | 89.4% |
| Discharge temperature | ° C. | 4.6 | 6.5 | 8.5 | 10.7 |
| Evaporator temp glide | K | 1.6 | 0.8 | 0.3 | 0.2 |
| Condenser temp glide | K | 0.8 | 0.3 | 0.1 | 0.1 |
| Volumetric capacity | kJ/m3 | 1067 | 1111 | 1141 | 1156 |
| Cooling COP | | 2.41 | 2.43 | 2.45 | 2.45 |

TABLE 19

Refrigeration performance modelling data for R-1132a/R-116/R-170 ternary system with 30-60% by weight R-1132a

| | | R170 (weight %) | | | | | |
|---|---|---|---|---|---|---|---|
| | | 4.0% | 8.0% | 12.0% | 16.0% | 20.0% | 24.0% |
| | | R1132a (weight %) | | | | | |
| | | 30% | 30% | 30% | 30% | 30% | 30% |
| | | R116 (weight %) | | | | | |
| | | 66.0% | 62.0% | 58.0% | 54.0% | 50.0% | 46.0% |
| GWP | | 8053 | 7565 | 7078 | 6590 | 6102 | 5614 |
| Evaporator pressure | bar | 1.14 | 1.25 | 1.33 | 1.39 | 1.43 | 1.45 |
| Condenser pressure | bar | 7.96 | 8.46 | 8.79 | 9.01 | 9.13 | 9.18 |
| Pressure ratio | | 6.96 | 6.75 | 6.60 | 6.48 | 6.40 | 6.34 |
| Volumetric efficiency | | 86.9% | 87.6% | 88.1% | 88.6% | 88.9% | 89.2% |
| Discharge temperature | ° C. | −1.5 | 1.4 | 3.8 | 6.0 | 8.2 | 10.5 |
| Evaporator temp glide | K | 1.7 | 1.8 | 1.5 | 1.0 | 0.6 | 0.5 |
| Condenser temp glide | K | 1.4 | 1.3 | 0.9 | 0.5 | 0.3 | 0.3 |
| Volumetric capacity | kJ/m3 | 842 | 935 | 1004 | 1055 | 1090 | 1111 |
| Cooling COP | | 2.26 | 2.32 | 2.36 | 2.38 | 2.40 | 2.41 |

| | | R170 (weight %) | | | | |
|---|---|---|---|---|---|---|
| | | 28.0% | 4.0% | 8.0% | 12.0% | 16.0% |
| | | R1132a (weight %) | | | | |
| | | 30% | 40% | 40% | 40% | 40% |
| | | R116 (weight %) | | | | |
| | | 42.0% | 56.0% | 52.0% | 48.0% | 44.0% |
| GWP | | 5126 | 6834 | 6346 | 5858 | 5370 |
| Evaporator pressure | bar | 1.45 | 1.16 | 1.25 | 1.31 | 1.36 |
| Condenser pressure | bar | 9.17 | 7.99 | 8.40 | 8.67 | 8.84 |
| Pressure ratio | | 6.31 | 6.89 | 6.73 | 6.61 | 6.52 |
| Volumetric efficiency | | 89.4% | 87.3% | 87.8% | 88.3% | 88.6% |
| Discharge temperature | ° C. | 12.7 | 0.3 | 3.1 | 5.7 | 8.0 |
| Evaporator temp glide | K | 0.4 | 1.0 | 1.2 | 1.1 | 1.0 |
| Condenser temp glide | K | 0.3 | 0.9 | 1.0 | 0.8 | 0.6 |

TABLE 19-continued

Refrigeration performance modelling data for R-1132a/R-116/R-170 ternary system with 30-60% by weight R-1132a

| | | | | | | |
|---|---|---|---|---|---|---|
| Volumetric capacity | kJ/m3 | 1122 | 851 | 930 | 989 | 1030 |
| Cooling COP | | 2.42 | 2.25 | 2.30 | 2.34 | 2.36 |

| | | R170 (weight %) | | | | | |
|---|---|---|---|---|---|---|---|
| | | 20.0% | 24.0% | 28.0% | 4.0% | 8.0% | 12.0% |
| | | | | R1132a (weight %) | | | |
| | | 40% | 40% | 40% | 60.0% | 60.0% | 60.0% |
| | | | | R116 (weight %) | | | |
| | | 40.0% | 36.0% | 32.0% | 36.0% | 32.0% | 28.0% |
| GWP | | 4882 | 4394 | 3906 | 4395 | 3907 | 3419 |
| Evaporator pressure | bar | 1.38 | 1.40 | 1.40 | 1.12 | 1.19 | 1.23 |
| Condenser pressure | bar | 8.94 | 8.98 | 8.97 | 7.79 | 8.08 | 8.28 |
| Pressure ratio | | 6.46 | 6.42 | 6.39 | 6.92 | 6.81 | 6.73 |
| Volumetric efficiency | | 88.9% | 89.2% | 89.4% | 87.6% | 88.0% | 88.4% |
| Discharge temperature | °C. | 10.3 | 12.6 | 14.7 | 4.9 | 7.6 | 10.1 |
| Evaporator temp glide | K | 0.8 | 0.7 | 0.7 | 0.9 | 1.3 | 1.4 |
| Condenser temp glide | K | 0.5 | 0.5 | 0.5 | 0.9 | 1.1 | 1.1 |
| Volumetric capacity | kJ/m3 | 1058 | 1076 | 1085 | 837 | 895 | 938 |
| Cooling COP | | 2.38 | 2.39 | 2.39 | 2.25 | 2.29 | 2.32 |

| | | R170 (weight %) | | | |
|---|---|---|---|---|---|
| | | 16.0% | 20.0% | 24.0% | 28.0% |
| | | | R1132a (weight %) | | |
| | | 60.0% | 60.0% | 60.0% | 60.0% |
| | | | R116 (weight %) | | |
| | | 24.0% | 20.0% | 16.0% | 12.0% |
| GWP | | 2931 | 2443 | 1955 | 1467 |
| Evaporator pressure | bar | 1.26 | 1.28 | 1.29 | 1.30 |
| Condenser pressure | bar | 8.41 | 8.48 | 8.51 | 8.51 |
| Pressure ratio | | 6.66 | 6.62 | 6.58 | 6.56 |
| Volumetric efficiency | | 88.7% | 88.9% | 89.1% | 89.3% |
| Discharge temperature | °C. | 12.4 | 14.5 | 16.5 | 18.4 |
| Evaporator temp glide | K | 1.3 | 1.2 | 1.0 | 0.8 |
| Condenser temp glide | K | 1.0 | 0.9 | 0.7 | 0.6 |
| Volumetric capacity | kJ/m3 | 968 | 990 | 1004 | 1012 |
| Cooling COP | | 2.33 | 2.35 | 2.35 | 2.36 |

TABLE 20

Refrigeration performance modelling data for R-1132a/R-116/R-170/R-744 quaternary system with 4-12% by weight R-744

| | | \multicolumn{6}{c}{R170 (weight %)} | | | | | |
|---|---|---|---|---|---|---|---|
| | | 4.0% | 4.0% | 4.0% | 4.0% | 4.0% | 4.0% |
| | | \multicolumn{6}{c}{R744 (weight %)} |
| | | 4.0% | 4.0% | 4.0% | 4.0% | 4.0% | 4.0% |
| | | \multicolumn{6}{c}{R1132a (weight %)} |
| | | 20.0% | 30.0% | 40.0% | 50.0% | 60.0% | 70.0% |
| | | \multicolumn{6}{c}{R116 (weight %)} |
| | | 76.0% | 66.0% | 56.0% | 46.0% | 36.0% | 26.0% |
| GWP | | 9273 | 8053 | 6834 | 5614 | 4395 | 3175 |
| Evaporator pressure | bar | 1.19 | 1.22 | 1.22 | 1.20 | 1.16 | 1.13 |
| Condenser pressure | bar | 8.45 | 8.52 | 8.46 | 8.33 | 8.14 | 7.93 |
| Pressure ratio | | 7.08 | 6.99 | 6.95 | 6.95 | 6.99 | 7.04 |
| Volumetric efficiency | | 86.7% | 87.1% | 87.4% | 87.6% | 87.7% | 87.7% |
| Discharge temperature | °C. | 0.6 | 2.0 | 3.6 | 5.7 | 7.9 | 10.1 |
| Evaporator temp glide | K | 3.5 | 2.1 | 1.4 | 1.2 | 1.2 | 1.3 |
| Condenser temp glide | K | 3.8 | 2.4 | 1.8 | 1.6 | 1.6 | 1.6 |
| Volumetric capacity | kJ/m3 | 904 | 909 | 905 | 893 | 875 | 856 |
| Cooling COP | | 2.31 | 2.27 | 2.26 | 2.25 | 2.25 | 2.25 |

| | | \multicolumn{5}{c}{R170 (weight %)} | | | | |
|---|---|---|---|---|---|---|
| | | 4.0% | 4.0% | 8.0% | 8.0% | 8.0% |
| | | \multicolumn{5}{c}{R744 (weight %)} |
| | | 4.0% | 4.0% | 8.0% | 8.0% | 8.0% |
| | | \multicolumn{5}{c}{R1132a (weight %)} |
| | | 80.0% | 90.0% | 20.0% | 30.0% | 40.0% |
| | | \multicolumn{5}{c}{R116 (weight %)} |
| | | 16.0% | 6.0% | 72.0% | 62.0% | 52.0% |
| GWP | | 1955 | 736 | 8785 | 7566 | 6346 |
| Evaporator pressure | bar | 1.09 | 1.05 | 1.39 | 1.38 | 1.35 |
| Condenser pressure | bar | 7.72 | 7.49 | 9.50 | 9.40 | 9.21 |
| Pressure ratio | | 7.10 | 7.17 | 6.84 | 6.81 | 6.82 |
| Volumetric efficiency | | 87.8% | 87.8% | 87.6% | 87.8% | 88.0% |
| Discharge temperature | °C. | 12.1 | 13.9 | 6.1 | 7.3 | 8.9 |
| Evaporator temp glide | K | 1.2 | 1.0 | 3.6 | 2.3 | 1.8 |
| Condenser temp glide | K | 1.5 | 1.3 | 3.7 | 2.6 | 2.2 |
| Volumetric capacity | kJ/m3 | 837 | 816 | 1064 | 1046 | 1021 |
| Cooling COP | | 2.26 | 2.27 | 2.35 | 2.32 | 2.30 |

TABLE 20-continued

Refrigeration performance modelling data for R-1132a/R-116/R-170/R-744 quaternary system with 4-12% by weight R-744

|  |  | R170 (weight %) | | | | | |
|---|---|---|---|---|---|---|---|
|  |  | 8.0% | 8.0% | 8.0% | 8.0% | 12.0% | 12.0% |
|  |  | R744 (weight %) | | | | | |
|  |  | 8.0% | 8.0% | 8.0% | 8.0% | 12.0% | 12.0% |
|  |  | R1132a (weight %) | | | | | |
|  |  | 50.0% | 60.0% | 70.0% | 80.0% | 20.0% | 30.0% |
|  |  | R116 (weight %) | | | | | |
|  |  | 42.0% | 32.0% | 22.0% | 12.0% | 68.0% | 58.0% |
| GWP |  | 5126 | 3907 | 2687 | 1468 | 8297 | 7078 |
| Evaporator pressure | bar | 1.31 | 1.26 | 1.21 | 1.16 | 1.53 | 1.50 |
| Condenser pressure | bar | 8.97 | 8.71 | 8.45 | 8.18 | 10.24 | 10.01 |
| Pressure ratio |  | 6.87 | 6.93 | 6.99 | 7.06 | 6.68 | 6.69 |
| Volumetric efficiency |  | 88.1% | 88.1% | 88.1% | 88.1% | 88.3% | 88.4% |
| Discharge temperature | °C. | 10.9 | 12.9 | 14.9 | 16.6 | 10.4 | 11.7 |
| Evaporator temp glide | K | 1.7 | 1.8 | 1.8 | 1.6 | 3.0 | 2.1 |
| Condenser temp glide | K | 2.2 | 2.2 | 2.2 | 2.1 | 3.1 | 2.5 |
| Volumetric capacity | kJ/m3 | 991 | 961 | 931 | 903 | 1180 | 1144 |
| Cooling COP |  | 2.29 | 2.28 | 2.28 | 2.28 | 2.37 | 2.34 |

|  |  | R170 (weight %) | | | | |
|---|---|---|---|---|---|---|
|  |  | 12.0% | 12.0% | 12.0% | 12.0% | 12.0% |
|  |  | R744 (weight %) | | | | |
|  |  | 12.0% | 12.0% | 12.0% | 12.0% | 12.0% |
|  |  | R1132a (weight %) | | | | |
|  |  | 40.0% | 50.0% | 60.0% | 70.0% | 80.0% |
|  |  | R116 (weight %) | | | | |
|  |  | 48.0% | 38.0% | 28.0% | 18.0% | 8.0% |
| GWP |  | 5858 | 4638 | 3419 | 2199 | 980 |
| Evaporator pressure | bar | 1.44 | 1.39 | 1.33 | 1.27 | 1.22 |
| Condenser pressure | bar | 9.73 | 9.43 | 9.13 | 8.83 | 8.55 |
| Pressure ratio |  | 6.74 | 6.81 | 6.88 | 6.95 | 7.02 |
| Volumetric efficiency |  | 88.5% | 88.5% | 88.5% | 88.4% | 88.4% |
| Discharge temperature | °C. | 13.5 | 15.4 | 17.2 | 18.9 | 20.5 |
| Evaporator temp glide | K | 1.9 | 2.0 | 2.0 | 2.0 | 1.8 |
| Condenser temp glide | K | 2.3 | 2.4 | 2.4 | 2.4 | 2.3 |
| Volumetric capacity | kJ/m3 | 1103 | 1062 | 1024 | 988 | 954 |
| Cooling COP |  | 2.32 | 2.30 | 2.29 | 2.29 | 2.28 |

TABLE 21

Refrigeration performance modelling data for R-1132a/R-116/R-170/R-744 quaternary system with 8-24% by weight R-744

| | | R170 (weight %) | | | | | |
|---|---|---|---|---|---|---|---|
| | | 4.0% | 4.0% | 4.0% | 4.0% | 4.0% | 4.0% |
| | | R744 (weight %) | | | | | |
| | | 8.0% | 8.0% | 8.0% | 8.0% | 8.0% | 8.0% |
| | | R1132va (weight %) | | | | | |
| | | 20.0% | 30.0% | 40.0% | 50.0% | 60.0% | 70.0% |
| | | R116 (weight %) | | | | | |
| | | 76.0% | 66.0% | 56.0% | 46.0% | 36.0% | 26.0% |
| GWP | | 9273 | 8053 | 6834 | 5614 | 4395 | 3175 |
| Evaporator pressure | bar | 1.27 | 1.28 | 1.27 | 1.24 | 1.20 | 1.16 |
| Condenser pressure | bar | 8.97 | 8.96 | 8.84 | 8.66 | 8.44 | 8.21 |
| Pressure ratio | | 7.07 | 7.01 | 6.98 | 7.00 | 7.05 | 7.10 |
| Volumetric efficiency | | 86.9% | 87.2% | 87.5% | 87.6% | 87.7% | 87.8% |
| Discharge temperature | °C. | 3.7 | 4.9 | 6.5 | 8.5 | 10.6 | 12.6 |
| Evaporator temp glide | K | 3.6 | 2.2 | 1.5 | 1.4 | 1.4 | 1.4 |
| Condenser temp glide | K | 4.2 | 2.8 | 2.2 | 2.0 | 2.0 | 2.0 |
| Volumetric capacity | kJ/m3 | 970 | 963 | 950 | 930 | 908 | 885 |
| Cooling COP | | 2.32 | 2.28 | 2.26 | 2.25 | 2.25 | 2.25 |

| | | R170 (weight %) | | | | |
|---|---|---|---|---|---|---|
| | | 4.0% | 4.0% | 8.0% | 8.0% | 8.0% |
| | | R744 (weight %) | | | | |
| | | 8.0% | 8.0% | 16.0% | 16.0% | 16.0% |
| | | R1132va (weight %) | | | | |
| | | 80.0% | 90.0% | 20.0% | 30.0% | 40.0% |
| | | R116 (weight %) | | | | |
| | | 16.0% | 6.0% | 72.0% | 62.0% | 52.0% |
| GWP | | 1955 | 736 | 8785 | 7566 | 6346 |
| Evaporator pressure | bar | 1.11 | 1.07 | 1.49 | 1.46 | 1.42 |
| Condenser pressure | bar | 7.97 | 7.73 | 10.22 | 10.02 | 9.75 |
| Pressure ratio | | 7.15 | 7.22 | 6.85 | 6.85 | 6.89 |
| Volumetric efficiency | | 87.8% | 87.8% | 87.9% | 88.1% | 88.2% |
| Discharge temperature | °C. | 14.5 | 16.2 | 10.9 | 12.1 | 13.7 |
| Evaporator temp glide | K | 1.4 | 1.1 | 3.2 | 2.3 | 2.0 |
| Condenser temp glide | K | 1.9 | 1.7 | 3.6 | 2.8 | 2.5 |
| Volumetric capacity | kJ/m3 | 863 | 840 | 1152 | 1120 | 1082 |
| Cooling COP | | 2.26 | 2.26 | 2.35 | 2.32 | 2.29 |

TABLE 21-continued

Refrigeration performance modelling data for R-1132a/R-116/R-170/R-744 quaternary system with 8-24% by weight R-744

| | | R170 (weight %) | | | | | |
|---|---|---|---|---|---|---|---|
| | | 8.0% | 8.0% | 8.0% | 8.0% | 12.0% | 12.0% |
| | | R744 (weight %) | | | | | |
| | | 16.0% | 16.0% | 16.0% | 16.0% | 24.0% | 24.0% |
| | | R1132a (weight %) | | | | | |
| | | 50.0% | 60.0% | 70.0% | 80.0% | 20.0% | 30.0% |
| | | R116 (weight %) | | | | | |
| | | 42.0% | 32.0% | 22.0% | 12.0% | 68.0% | 58.0% |
| GWP | | 5126 | 3907 | 2687 | 1468 | 8297 | 7078 |
| Evaporator pressure | bar | 1.36 | 1.31 | 1.25 | 1.20 | 1.64 | 1.58 |
| Condenser pressure | bar | 9.46 | 9.16 | 8.87 | 8.59 | 11.02 | 10.70 |
| Pressure ratio | | 6.95 | 7.01 | 7.07 | 7.14 | 6.72 | 6.77 |
| Volumetric efficiency | | 88.2% | 88.2% | 88.2% | 88.2% | 88.6% | 88.6% |
| Discharge temperature | °C. | 15.6 | 17.4 | 19.1 | 20.7 | 16.4 | 17.9 |
| Evaporator temp glide | K | 1.9 | 2.0 | 1.9 | 1.8 | 2.4 | 2.1 |
| Condenser temp glide | K | 2.5 | 2.6 | 2.6 | 2.5 | 2.7 | 2.4 |
| Volumetric capacity | kJ/m3 | 1045 | 1009 | 976 | 944 | 1270 | 1219 |
| Cooling COP | | 2.28 | 2.27 | 2.27 | 2.27 | 2.35 | 2.32 |

| | | R170 (weight %) | | | | |
|---|---|---|---|---|---|---|
| | | 12.0% | 12.0% | 12.0% | 12.0% | 12.0% |
| | | R744 (weight %) | | | | |
| | | 24.0% | 24.0% | 24.0% | 24.0% | 24.0% |
| | | R1132a (weight %) | | | | |
| | | 40.0% | 50.0% | 60.0% | 70.0% | 80.0% |
| | | R116 (weight %) | | | | |
| | | 48.0% | 38.0% | 28.0% | 18.0% | 8.0% |
| GWP | | 5858 | 4639 | 3419 | 2199 | 980 |
| Evaporator pressure | bar | 1.51 | 1.45 | 1.39 | 1.33 | 1.27 |
| Condenser pressure | bar | 10.35 | 10.01 | 9.68 | 9.36 | 9.05 |
| Pressure ratio | | 6.84 | 6.91 | 6.98 | 7.05 | 7.11 |
| Volumetric efficiency | | 88.6% | 88.6% | 88.6% | 88.6% | 88.5% |
| Discharge temperature | °C. | 19.6 | 21.3 | 22.9 | 24.3 | 25.7 |
| Evaporator temp glide | K | 2.1 | 2.1 | 2.2 | 2.1 | 2.0 |
| Condenser temp glide | K | 2.5 | 2.6 | 2.7 | 2.7 | 2.6 |
| Volumetric capacity | kJ/m3 | 1168 | 1122 | 1079 | 1040 | 1004 |
| Cooling COP | | 2.30 | 2.28 | 2.27 | 2.27 | 2.26 |

TABLE 22

Refrigeration performance modelling data for R-1132a/R-116/R-170/R-744 quaternary system with 12-36% b/w R-744

| | | \multicolumn{6}{c}{R170 (weight %)} |
|---|---|---|---|---|---|---|---|
| | | 4.0% | 4.0% | 4.0% | 4.0% | 4.0% | 4.0% |
| | | \multicolumn{6}{c}{R744 (weight %)} |
| | | 12.0% | 12.0% | 12.0% | 12.0% | 12.0% | 12.0% |
| | | \multicolumn{6}{c}{R1132a (weight %)} |
| | | 20.0% | 30.0% | 40.0% | 50.0% | 60.0% | 70.0% |
| | | \multicolumn{6}{c}{R116 (weight %)} |
| | | 76.0% | 66.0% | 56.0% | 46.0% | 36.0% | 26.0% |
| GWP | | 9273 | 8053 | 6834 | 5614 | 4395 | 3175 |
| Evaporator pressure | bar | 1.33 | 1.33 | 1.31 | 1.27 | 1.23 | 1.18 |
| Condenser pressure | bar | 9.40 | 9.32 | 9.16 | 8.94 | 8.69 | 8.44 |
| Pressure ratio | | 7.06 | 7.02 | 7.02 | 7.05 | 7.09 | 7.14 |
| Volumetric efficiency | | 87.1% | 87.4% | 87.6% | 87.7% | 87.8% | 87.8% |
| Discharge temperature | °C. | 6.4 | 7.6 | 9.2 | 11.1 | 13.1 | 15.0 |
| Evaporator temp glide | K | 3.4 | 2.2 | 1.6 | 1.5 | 1.5 | 1.5 |
| Condenser temp glide | K | 4.1 | 3.0 | 2.4 | 2.3 | 2.2 | 2.2 |
| Volumetric capacity | kJ/m3 | 1023 | 1008 | 988 | 962 | 936 | 911 |
| Cooling COP | | 2.32 | 2.28 | 2.26 | 2.25 | 2.25 | 2.25 |

| | | \multicolumn{5}{c}{R170 (weight %)} |
|---|---|---|---|---|---|---|
| | | 4.0% | 4.0% | 8.0% | 8.0% | 8.0% |
| | | \multicolumn{5}{c}{R744 (weight %)} |
| | | 12.0% | 12.0% | 24.0% | 24.0% | 24.0% |
| | | \multicolumn{5}{c}{R1132a (weight %)} |
| | | 80.0% | 90.0% | 20.0% | 30.0% | 40.0% |
| | | \multicolumn{5}{c}{R116 (weight %)} |
| | | 16.0% | 6.0% | 72.0% | 62.0% | 52.0% |
| GWP | | 1955 | 736 | 8785 | 7566 | 6346 |
| Evaporator pressure | bar | 1.14 | 1.09 | 1.56 | 1.51 | 1.46 |
| Condenser pressure | bar | 8.19 | 7.94 | 10.71 | 10.45 | 10.14 |
| Pressure ratio | | 7.20 | 7.26 | 6.87 | 6.90 | 6.95 |
| Volumetric efficiency | | 87.8% | 87.8% | 88.2% | 88.3% | 88.3% |
| Discharge temperature | °C. | 16.7 | 18.3 | 14.9 | 16.3 | 17.9 |
| Evaporator temp glide | K | 1.4 | 1.2 | 2.6 | 2.1 | 2.0 |
| Condenser temp glide | K | 2.1 | 1.9 | 3.1 | 2.6 | 2.5 |
| Volumetric capacity | kJ/m3 | 886 | 861 | 1211 | 1169 | 1125 |
| Cooling COP | | 2.25 | 2.26 | 2.34 | 2.31 | 2.29 |

TABLE 22-continued

Refrigeration performance modelling data for R-1132a/R-116/R-170/R-744 quaternary system with 12-36% b/w R-744

| | | R170 (weight %) | | | | | |
|---|---|---|---|---|---|---|---|
| | | 8.0% | 8.0% | 8.0% | 8.0% | 12.0% | 12.0% |
| | | | | R744 (weight %) | | | |
| | | 24.0% | 24.0% | 24.0% | 24.0% | 36.0% | 36.0% |
| | | | | R1132a (weight %) | | | |
| | | 50.0% | 60.0% | 70.0% | 80.0% | 20.0% | 30.0% |
| | | | | R116 (weight %) | | | |
| | | 42.0% | 32.0% | 22.0% | 12.0% | 68.0% | 58.0% |
| GWP | | 5126 | 3907 | 2687 | 1468 | 8298 | 7078 |
| Evaporator pressure | bar | 1.40 | 1.34 | 1.29 | 1.24 | 1.69 | 1.62 |
| Condenser pressure | bar | 9.82 | 9.51 | 9.20 | 8.91 | 11.46 | 11.10 |
| Pressure ratio | | 7.02 | 7.08 | 7.13 | 7.19 | 6.79 | 6.86 |
| Volumetric efficiency | | 88.3% | 88.3% | 88.3% | 88.3% | 88.8% | 88.8% |
| Discharge temperature | °C. | 19.6 | 21.3 | 22.8 | 24.2 | 21.7 | 23.3 |
| Evaporator temp glide | K | 2.0 | 2.0 | 2.0 | 1.9 | 2.0 | 2.0 |
| Condenser temp glide | K | 2.6 | 2.7 | 2.7 | 2.6 | 2.1 | 2.1 |
| Volumetric capacity | kJ/m3 | 1083 | 1045 | 1010 | 977 | 1316 | 1259 |
| Cooling COP | | 2.27 | 2.26 | 2.26 | 2.26 | 2.33 | 2.30 |

| | | R170 (weight %) | | | | |
|---|---|---|---|---|---|---|
| | | 12.0% | 12.0% | 12.0% | 12.0% | 12.0% |
| | | | | R744 (weight %) | | |
| | | 36.0% | 36.0% | 36.0% | 36.0% | 36.0% |
| | | | | R1132a (weight %) | | |
| | | 40.0% | 50.0% | 60.0% | 70.0% | 80.0% |
| | | | | R116 (weight %) | | |
| | | 48.0% | 38.0% | 28.0% | 18.0% | 8.0% |
| GWP | | 5858 | 4639 | 3419 | 2200 | 980 |
| Evaporator pressure | bar | 1.55 | 1.48 | 1.42 | 1.36 | 1.31 |
| Condenser pressure | bar | 10.74 | 10.38 | 10.04 | 9.72 | 9.41 |
| Pressure ratio | | 6.93 | 7.00 | 7.06 | 7.12 | 7.18 |
| Volumetric efficiency | | 88.8% | 88.7% | 88.7% | 88.7% | 88.6% |
| Discharge temperature | °C. | 24.8 | 26.3 | 27.7 | 28.9 | 30.1 |
| Evaporator temp glide | K | 2.1 | 2.2 | 2.2 | 2.1 | 2.0 |
| Condenser temp glide | K | 2.3 | 2.5 | 2.6 | 2.7 | 2.6 |
| Volumetric capacity | kJ/m3 | 1206 | 1159 | 1116 | 1077 | 1040 |
| Cooling COP | | 2.28 | 2.27 | 2.26 | 2.25 | 2.25 |

Flammability Data

The flammability behaviour of binary mixtures of R1132a with non-flammable R116 or R744 (carbon dioxide) was studied using a 12 litre glass flask apparatus, conforming to the apparatus and test method described in ASHRAE Standard 34 for evaluation of flammability of refrigerants. Binary mixtures of varying composition were tested using the Standard 34 test method at 60° C. with a constant humidity (corresponding to 50% relative humidity at 25° C.) to determine the maximum quantity of R-1132a that could be added to each non-flammable component without resulting in a flammable mixture.

It was found that the maximum quantity of R-1132a that could be added to R-116 without making the mixture flammable was 48% by volume, which corresponds to a composition of 30.5% by weight R-1132a, 69.5% by weight R-116. It was further determined that the maximum quantity of R-1132a that could be added to R-744 without generating a flammable mixture was 15% by volume.

Figure 6:
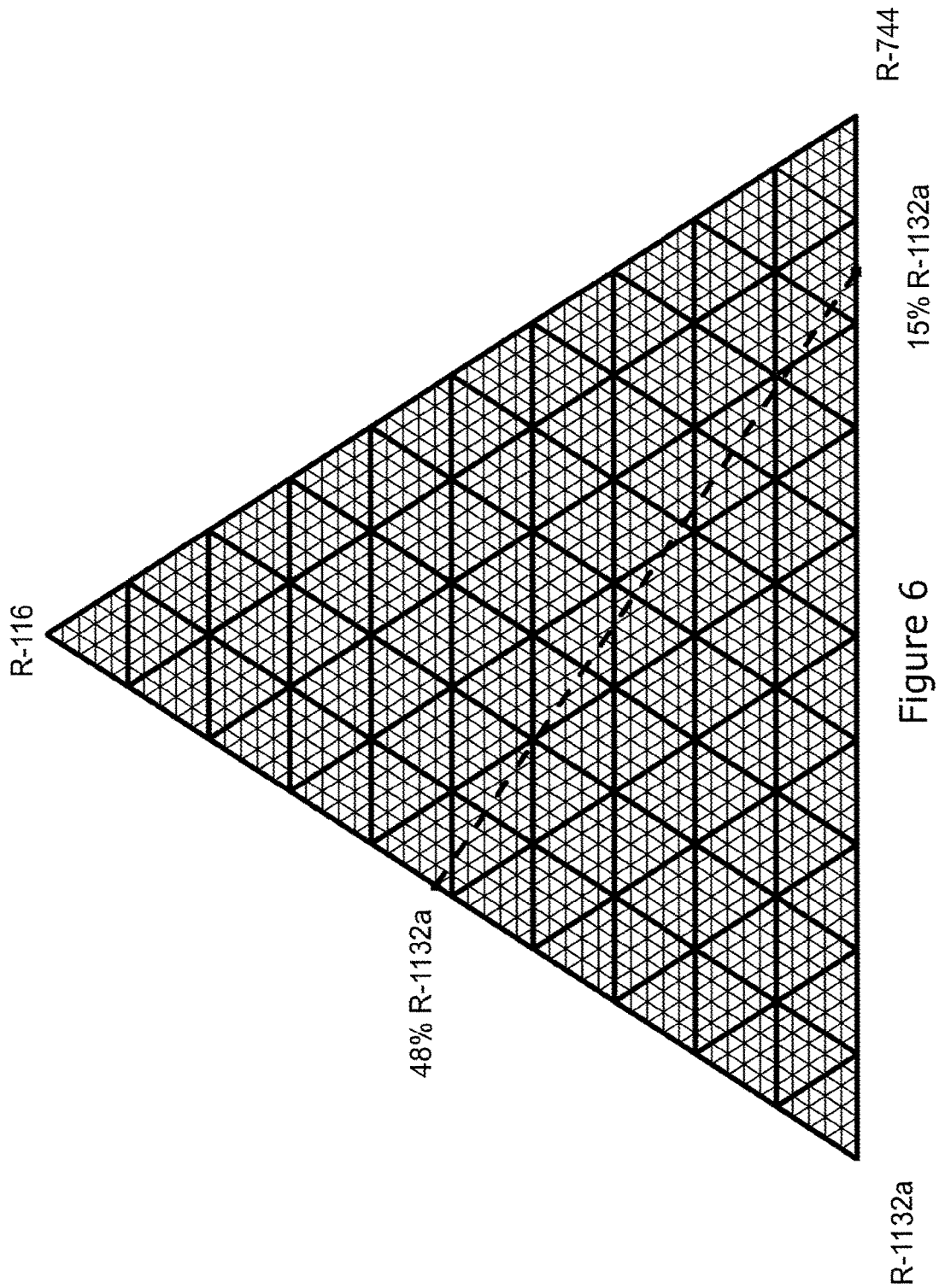
FIG. 6 shows flammability for R-744/R-1132a/R-116 at 60° C.

These flammability data were depicted pictorially in FIG. 6, showing a triangular composition diagram for ternary mixtures of R-744, R-1132a and R-116, with the units of composition being volume fraction. A dashed line is shown connecting the non-flammable binary compositions having the maximum quantity of R-1132a. Ternary compositions lying above and to the right of this line are anticipated to be non-flammable and are preferred compositions of the invention.

Performance Data—Binary R-1132a/R-116 Blends

The performance of selected binary compositions of R-1132a/R-116 was studied using a biomedical storage freezer appliance. This appliance was a Panasonic model MDF-U76VC freezer, comprising a cascade refrigeration system with a lower temperature stage operating on R-508B and an upper temperature stage rejecting heat to external ambient air using R-404A refrigerant. Its performance specification for the achieved internal storage compartment air temperature is −86° C. or lower when operated in an ambient air temperature of 30° C. The test was carried out as a drop-in test in which the R-508B refrigerant in the low temperature stage was replaced by binary compositions of the invention and the system was operated in a climate room to guarantee an ambient temperature of 30° C. The storage compartment air temperature, motor power consumption, refrigeration compressor operating temperature and pressure and refrigerant evaporating and condensing temperatures were all recorded. A reference test was carried out with R-508B refrigerant to provide comparative data. A further reference test was carried out using pure R-1132a in the lower stage to provide further comparative data.

The results recorded are shown in the following table. It was found that although R1132a alone could not meet the internal air temperature target, addition of R116 improved the performance of the refrigerant. This was demonstrated by the achieved cabinet air temperatures. The presence of the R1132a/R116 azeotrope was demonstrated by the air temperature going through a minimum as the azeotropic composition of ca. 50% w/w R1132a was approached. A composition of 51.1% R1132a/49.9% R116 was found to deliver an acceptable air temperature compared to that achieved with R-508B but at a lower compressor exit temperature. The latter is desirable to protect the compressor and avoid thermal degradation of its lubricating oil.

TABLE 23

Refrigeration performance data for selected R-1132a/R-116 blends

| R-116 content (% w/w) | Compressor exit temperature (° C.) | Cabinet air temperature (° C.) | Power (w) |
|---|---|---|---|
| 0 | 83.5 | −85.3 | 1132 |
| 16.9 | 83.6 | −87.7 | 1145 |
| 29.8 | 83.7 | −88.4 | 1151 |
| 35.7 | 84.1 | −88.6 | 1157 |
| 40.4 | 84.1 | −88.7 | 1162 |
| 45.3 | 84.7 | −88.5 | 1189 |
| 49.7 | 84.7 | −88.5 | 1189 |
| R508B comparison | 85.4 | −89.5 | 1158 |

Performance Data—Ternary R-744/R-1132a/R-116 Blends

In the same equipment as used for binary composition testing were tested several ternary compositions of R-744/R-1132a/R-116 at the same operating conditions. These were selected as non-flammable compositions on the basis of the flammability data reported above. Selected results are reproduced below.

TABLE 24

Refrigeration performance data for selected R-1132a/R-116/$CO_2$ blends

| Ambient Temperature 30° C. | R508B | Mixture A | Mixture B | Mixture C | Mixture D |
|---|---|---|---|---|---|
| R-1123 (% w/w) | | 33.6% | 31.1% | 30.0% | 29.1% |
| R-116 (% w/w) | | 66.4% | 61.5% | 59.4% | 57.5% |
| R-744 (% w/w) | | 0.0% | 7.4% | 10.6% | 13.4% |
| Compressor exit temperature (° C.) | 81.6 | 80.2 | 80.8 | 82.0 | 81.1 |
| Cabinet air temperature (° C.) | −88.2 | −83.4 | −87.2 | −88.3 | −89.2 |
| Power Input(W) | 1070 | 1040 | 1060 | 1080 | 1080 |

The ternary compositions delivered performance close to R508B. It was found that at the highest concentration of R-744 tested (13.4% w/w) slight instability in operation was observed, attributed to dry ice formation in the expansion device. Since this is an undesirable feature, it is concluded that for compositions where the mass ratio of R1132a to R116 is selected to ensure that this mixture is non-flammable, the R744 content is preferably less than about 13% w/w of the total.

Next were tested ternary compositions wherein the R-1132a/R-116 composition was close to the azeotropic composition and which are expected to be mildly flammable. Results from selected tests are shown in the table below.

TABLE 25

Refrigeration performance data for further selected R-1132a/R-116/$CO_2$ blends

| Ambient Temperature 30° C. | R508B | Mixture E | Mixture F | Mixture G | Mixture H | Mixture J |
|---|---|---|---|---|---|---|
| R-1132a (% w/w) | | 50.2% | 45.4% | 44.1% | 42.7% | 41.5% |
| R-116 (% w/w) | | 49.8% | 45.1% | 43.8% | 42.4% | 41.3% |

TABLE 25-continued

Refrigeration performance data for further selected R-1132a/R-116/CO$_2$ blends

| Ambient Temperature 30° C. | R508B | Mixture E | Mixture F | Mixture G | Mixture H | Mixture J |
|---|---|---|---|---|---|---|
| R-744 (% w/w) | | 0.0% | 9.6% | 12.2% | 14.9% | 17.2% |
| Compressor exit temperature (° C.) | 81.6 | 83.2 | 81.4 | 82.1 | 82.1 | 82.7 |
| Cabinet air temperature (° C.) | −88.2 | −87.60 | −90.0 | −90.1 | −90.4 | −90.3 |
| Power Input (W) | 1070 | 1080 | 1100 | 1100 | 1100 | 1100 |

It is believed that at lower concentrations of R-116 a further increase in R-744 content may be achieved without formation of dry ice, and thus certain preferred ternary R-744/R-1132a/R-116 compositions are those wherein the refrigeration performance can deliver a final air temperature within 3K of that achievable with R-508B without the formation of dry ice in the systems' expansion device or evaporator inlet pipe.

To investigate the potential maximum amount of R-744 that could be added a study was carried out by adding progressively increasing quantities of R744 to mixtures of R1132a and R116 in a constant volume stirred vessel at a temperature of −66° C. (selected as being below the triple point of R-744) and measuring the vapour pressure of the resulting ternary mixtures after mixing and equilibration of the system. Two binary composition ratios of R-1132a/R-116 were used (28 mol % and 75 mol % R1132a). It was found that with both these tests that the maximum quantity of R-744 that could be added before the vapour pressure no longer increased on further addition of R-744, which indicated formation of solid phase R-744, was about 0.5 mol fraction in the ternary mixture. Thus additionally preferred ternary compositions are those wherein the mol fraction of R-744 in the ternary composition is less than 0.5 with more preferred compositional limits as explained above.

The invention is defined by the following claims.

The invention claimed is:

1. An azeotropic or near-azeotropic composition comprising 1,1-difluoroethene (R-1132a) and ethane (R-170).

2. A composition according to claim 1 comprising from about 20 to about 99% by weight of R-1132a and from about 1 to about 80% by weight of R-170.

3. A composition according to claim 2 comprising from about 50 to about 99% by weight of R-1132a and from about 1 to about 50% by weight of R-170.

4. A composition according to claim 3 comprising from about 75 to about 99% by weight of R-1132a and from about 1 to about 25% by weight of R-170.

5. A composition according to claim 1 comprising from about 4 to about 96% by weight of R-1132a and from about 4 to about 96% by weight of R-170.

6. A composition according to claim 5 comprising from about 12 to about 92% by weight of R-1132a and from about 8 to about 88% by weight of R-170.

7. A composition according to claim 6 comprising from about 20 to about 88% by weight of R-1132a and from about 12 to about 80% by weight of R-170.

8. A composition according to claim 7 comprising from about 32 to about 84% by weight of R-1132a and from about 16 to about 68% by weight of R-170.

9. A composition according to claim 8 comprising from about 36 to about 64% by weight of R-1132a and from about 64 to about 36% by weight of R-170.

10. A composition according to claim 9 comprising from about 40 to about 60% by weight of R-1132a and from about 60 to about 40% by weight of R-170.

11. A composition according to claim 10, wherein the composition comprises from about 44 to about 56% by weight of R-1132a and from about 44 to about 56% by weight of R-170.

12. A composition according to claim 10 selected from the group of compositions:
    (a) comprising about 44% by weight of R-1132a and about 56% by weight of R-170;
    (b) comprising about 45% by weight of R-1132a and about 55% by weight of R-170;
    (c) comprising about 46% by weight of R-1132a and about 54% by weight of R-170;
    (d) comprising about 48% by weight of R-1132a and about 52% by weight of R-170;
    (e) comprising about 50% by weight of R-1132a and about 50% by weight of R-170;
    (f) comprising about 52% by weight of R-1132a and about 48% by weight of R-170;
    (g) comprising about 55% by weight of R-1132a and about 45% by weight of R-170;
    (h) comprising about 56% by weight of R-1132a and about 44% by weight of R-170; and
    (i) comprising about 59% by weight of R-1132a and about 41% by weight of R-170.

13. A composition according to claim 1 consisting essentially of R-1132a and R-170.

14. A composition according to claim 1 whose volumetric refrigeration capacity is at least 90% of that of R-508B at comparable cycle conditions.

15. A composition according to claim 1 whose compressor discharge temperature is within 15 K of that of R-508B at comparable cycle conditions.

16. A heat transfer device containing a composition as defined in claim 1.

17. A heat transfer device according to claim 16 wherein the heat transfer device is a refrigeration device and comprises an ultra-low temperature refrigeration system and/or a cascade system.

18. A method for cooling an article which comprises condensing a composition defined in claim 1 and thereafter evaporating the composition in the vicinity of the article to be cooled.

19. A method for heating an article which comprises condensing a composition as defined in claim 1 in the vicinity of the article to be heated and thereafter evaporating the composition.

20. A method of retrofitting a heat transfer device comprising the step of removing an existing heat transfer composition, and introducing a composition as defined in claim 1.

21. A method of claim 20 wherein the heat transfer device is a refrigeration device and the heat transfer composition is a refrigerant selected from R-508A, R-508B, R-23 and R-1361.

* * * * *